US010885564B1

(12) United States Patent
Jayaram

(10) Patent No.: US 10,885,564 B1
(45) Date of Patent: Jan. 5, 2021

(54) METHODS, SYSTEM, AND NON-TRANSITORY COMPUTER READABLE STORAGE MEDIUM FOR DYNAMICALLY CONFIGURABLE SOCIAL MEDIA PLATFORM

(71) Applicant: Snap Inc., Santa Monica, CA (US)

(72) Inventor: Krish Jayaram, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 429 days.

(21) Appl. No.: 15/824,374

(22) Filed: Nov. 28, 2017

(51) Int. Cl.
*G06Q 30/00* (2012.01)
*G06Q 30/06* (2012.01)
*G06Q 20/32* (2012.01)

(52) U.S. Cl.
CPC ..... *G06Q 30/0623* (2013.01); *G06Q 20/3276* (2013.01); *G06Q 30/0603* (2013.01); *G06Q 30/0633* (2013.01); *G06Q 30/0641* (2013.01); *G06Q 30/0643* (2013.01)

(58) Field of Classification Search
CPC . G06Q 30/0601–0645; G06Q 30/0623; G06Q 30/0603; G06Q 30/0633; G06Q 30/0643; G06Q 30/0641; G06Q 20/3276
USPC ................................................ 705/26.1–27.2
See application file for complete search history.

(56) References Cited

U.S. PATENT DOCUMENTS

| | | |
|---|---|---|
| 5,754,939 A | 5/1998 | Herz et al. |
| 6,038,295 A | 3/2000 | Mattes |
| 6,158,044 A | 12/2000 | Tibbetts |
| 6,167,435 A | 12/2000 | Druckenmiller et al. |
| 6,205,432 B1 | 3/2001 | Gabbard et al. |
| 6,310,694 B1 | 10/2001 | Okimoto et al. |
| 6,484,196 B1 | 11/2002 | Maurille |
| 6,487,586 B2 | 11/2002 | Ogilvie et al. |

(Continued)

FOREIGN PATENT DOCUMENTS

| | | |
|---|---|---|
| CA | 2887596 | 7/2015 |
| WO | 2012000107 | 1/2012 |

(Continued)

OTHER PUBLICATIONS

Why QR Codes are on the Rise: The Economist Explains. Nov. 2, 2017 (Nov. 2, 2017). The Economist (Online) the Economist Newspaper NA, Inc. (Year: 2017).*

(Continued)

*Primary Examiner* — Allison G Wood
(74) *Attorney, Agent, or Firm* — Schwegman Lundberg & Woessner, P.A.

(57) ABSTRACT

Disclosed are systems, methods, and computer-readable storage media to provide integrated ecommerce solution on a social network. In some aspects, the social network may provide an ecommerce interface for products offered by the social network itself. A social network ecommerce engine may provide data driven capability, enabling it to import product information offered by other vendors. The products offered by these vendors may then be presented to social network users via the social network interface. By providing a unified ecommerce interface for both products offered by the social network and those offered by other vendors, a user's ecommerce experience on the social network is enhanced, leading to increased purchases of products via the social network.

18 Claims, 30 Drawing Sheets

FIG. 4

(56) References Cited

U.S. PATENT DOCUMENTS

| | | |
|---|---|---|
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,912,896 B2 | 3/2011 | Wolovitz et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,111,164 B1* | 8/2015 | Anderton ............... G06K 7/1413 |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 2002/0047868 A1 | 4/2002 | Miyazawa |
| 2002/0073046 A1* | 6/2002 | David ............... G06F 21/33 705/67 |
| 2002/0144154 A1 | 10/2002 | Tomkow |
| 2003/0052925 A1 | 3/2003 | Daimon et al. |
| 2003/0126215 A1 | 7/2003 | Udell |
| 2003/0217106 A1 | 11/2003 | Adar |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0042588 A1 | 2/2009 | Lottin et al. |
| 2009/0132453 A1 | 5/2009 | Hangartner et al. |
| 2010/0082427 A1 | 4/2010 | Burgener et al. |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0099507 A1 | 4/2011 | Nesladek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0320170 A1 | 12/2011 | Lee et al. |
| 2012/0028659 A1 | 2/2012 | Whitney et al. |
| 2012/0173426 A1* | 7/2012 | Foster ............... G06Q 20/40 705/44 |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0194301 A1 | 8/2013 | Robbins et al. |
| 2013/0290443 A1 | 10/2013 | Collins et al. |
| 2014/0032682 A1 | 1/2014 | Prado et al. |
| 2014/0122787 A1 | 5/2014 | Shalvi et al. |
| 2014/0201527 A1 | 7/2014 | Krivorot |
| 2014/0282096 A1 | 9/2014 | Rubinstein et al. |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0199082 A1 | 7/2015 | Scholler et al. |
| 2015/0227602 A1 | 8/2015 | Ramu et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0117656 A1* | 4/2016 | Xu ............... G06Q 20/14 705/34 |
| 2016/0180887 A1 | 6/2016 | Sehn |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0032505 A1* | 2/2017 | Levieux ............... G01S 19/13 |
| 2017/0161382 A1 | 6/2017 | Ouimet et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |

(56) References Cited

U.S. PATENT DOCUMENTS

2017/0374003 A1    12/2017    Allen et al.
2017/0374508 A1    12/2017    Davis et al.

FOREIGN PATENT DOCUMENTS

| | | |
|---|---|---|
| WO | 2013008251 | 1/2013 |
| WO | 2014194262 | 12/2014 |
| WO | 2015192026 | 12/2015 |
| WO | 2016054562 | 4/2016 |
| WO | 2016065131 | 4/2016 |
| WO | 2016/112299 | 7/2016 |
| WO | 2016179166 | 11/2016 |
| WO | 2016179235 | 11/2016 |
| WO | 2017176739 | 10/2017 |
| WO | 2017176992 | 10/2017 |
| WO | 2018005644 | 1/2018 |

OTHER PUBLICATIONS

Castelluccia, Claude, "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", URL: http: www.theregister.co.uk 2005 12 12 stealthtext , (Dec. 12, 2005), 1 pg.

Melanson, Mike, "This text message will self destruct in 60 seconds", URL: http: readwrite.com 2011 02 11 this_text_message_will_self destruct_in_60_seconds, (Feb. 18, 2015), 4 pgs.

Sawers, Paul, "Snapchat for iOS Lets You Send Photos to Friends and Set How long They're Visible for", URL: https: thenextweb.com apps 2012 05 07 snapchat-for-ios-lets-you-send-photos-to-friends-and-set-how-long-theyre-visible-for , (May 7, 2012), 5 pgs.

Shein, Esther, "Ephemeral Data", Communications of the ACM, vol. 56, No. 9, (Sep. 2013), 20-22.

Vaas, Lisa, "StealthText, Should You Choose to Accept It", URL: http: www.eweek.com print c a MessagingandCollaboration StealthTextShouldYouChoosetoAcceptIt, (Dec. 13, 2005), 2 pgs.

\* cited by examiner

METHODS, SYSTEM, AND NON-TRANSITORY COMPUTER READABLE STORAGE MEDIUM FOR DYNAMICALLY CONFIGURABLE SOCIAL MEDIA PLATFORM

TECHNICAL FIELD

The present disclosure generally relates to the technical field of social networking. In particular methods, systems, and devices for facilitating ecommerce transactions via a social network are disclosed.

BACKGROUND

Social networking is becoming essential to many as a form of communication. Social networking applications enable a user to view content provided by other users. Users may also be able to view other content, for example, content providing information such as news, historical information, or other types of information. Ecommerce may be an important revenue source for social network operators. Therefore, improved methods of utilizing a social network to facilitate ecommerce are desired.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

QR codes, and other optical barcodes (e.g., Universal Product Code (UPC) barcodes, Aztec code, Data Matrix, Dataglyph, MaxiCode, PDF417, Ultra Code), are a convenient way to share small pieces of information with users of mobile devices, wearable devices, and other smart devices. For instance, QR codes are two-dimensional optical barcodes that encode information readable by a device (e.g., a smart phone) equipped with a camera sensor.

Some disclosed embodiments are methods, devices, and systems to link an optical barcode to a product. Upon scanning of the optical barcode, the disclosed devices may display information regarding the product. In some embodiments, the product information may be displayed within an ecommerce system, such that a user can review details about the product, select product options such as colors and/or sizes, and purchase the product.

In some systems, social network users become accustomed to a particular user interface and after learning how the user interface operates, may operate it without substantial effort. Some such users may prefer to perform most of their tasks from within this "native" user interface. Some implementations of social networks may provide an ecommerce user interface for products offered by the social network itself. If a user of these social networks seeks to purchase products not offered by the social network, they may have to utilize a different user interface to do so. This makes the user's experience less desirable, at least because the user must learn to utilize two interfaces. In some cases, this may result is a reduced number of purchases by the social network user. For example, if the social network user may easily purchase products from a variety of vendors via the social network interface with which they have become familiar, they may purchase more than they would otherwise.

Some disclosed methods, devices, and systems provide for the use of a native user interface of a social network not only for an ecommerce experience with products offered by the social network itself, but also for products provided by other vendors not directly associated with the social network.

Figure 1:
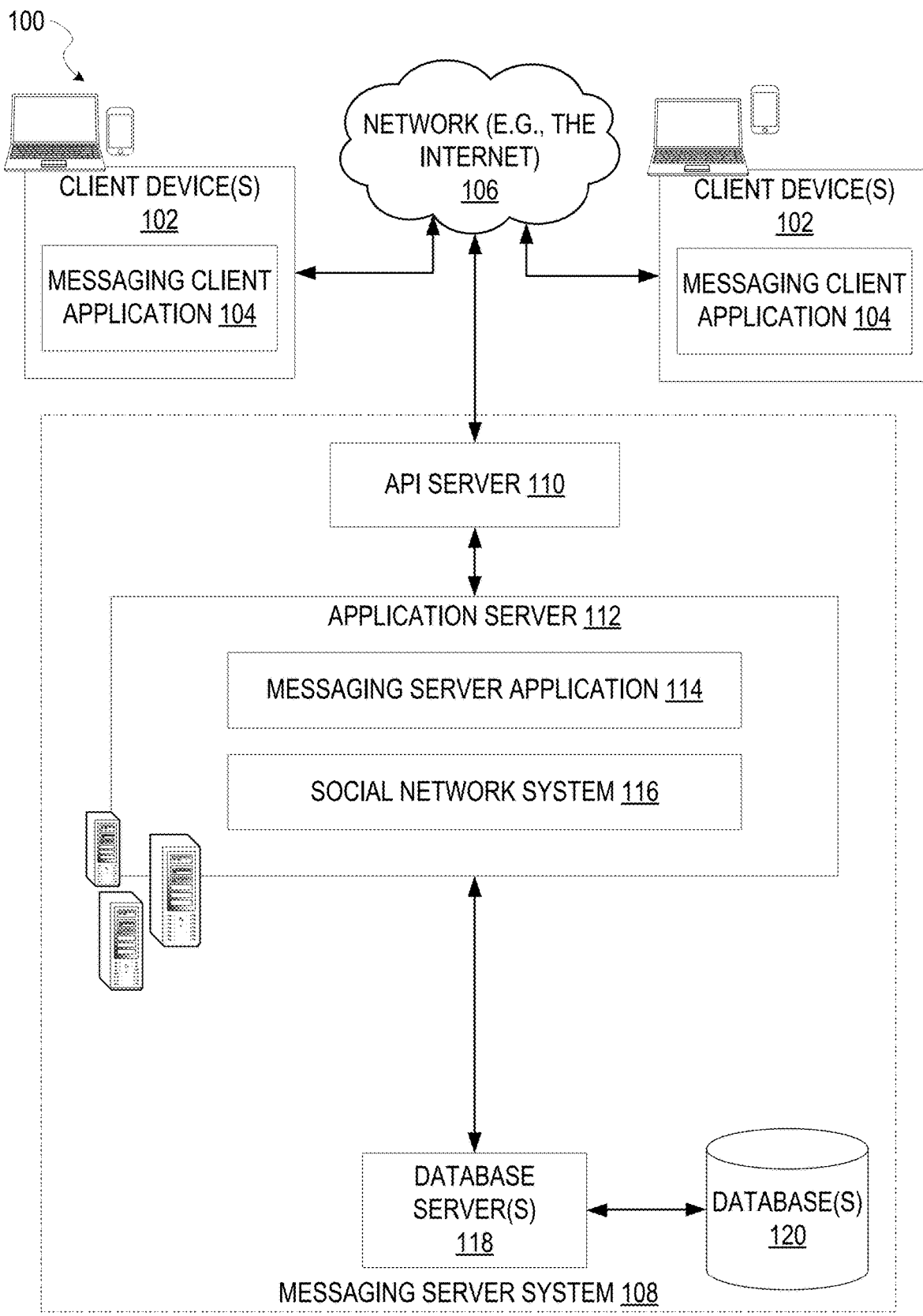
FIG. 1 is an exemplary block diagram of a messaging system for exchanging data (e.g., messages and associated content) over a network.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

Methods, devices, and systems disclosed herein may provide the social messaging system 100 with ecommerce functions for products provided by the social network provider, and also for products provided by entities not closely affiliated with the social network provider. For example, separate corporations or separate organizations, with no common ownership, may provide products for sale within a native user interface of the social network system 116. A user of the social messaging system 100 may utilize the user interface native to the social messaging system 100 to perform ecommerce functions for these products, resulting in an easier to use ecommerce system, when compared to traditional social networking systems that may require a transition from a user interface of the social networking system to a separate ecommerce application when purchasing products provided by the separate organization or entity.

Figure 2:
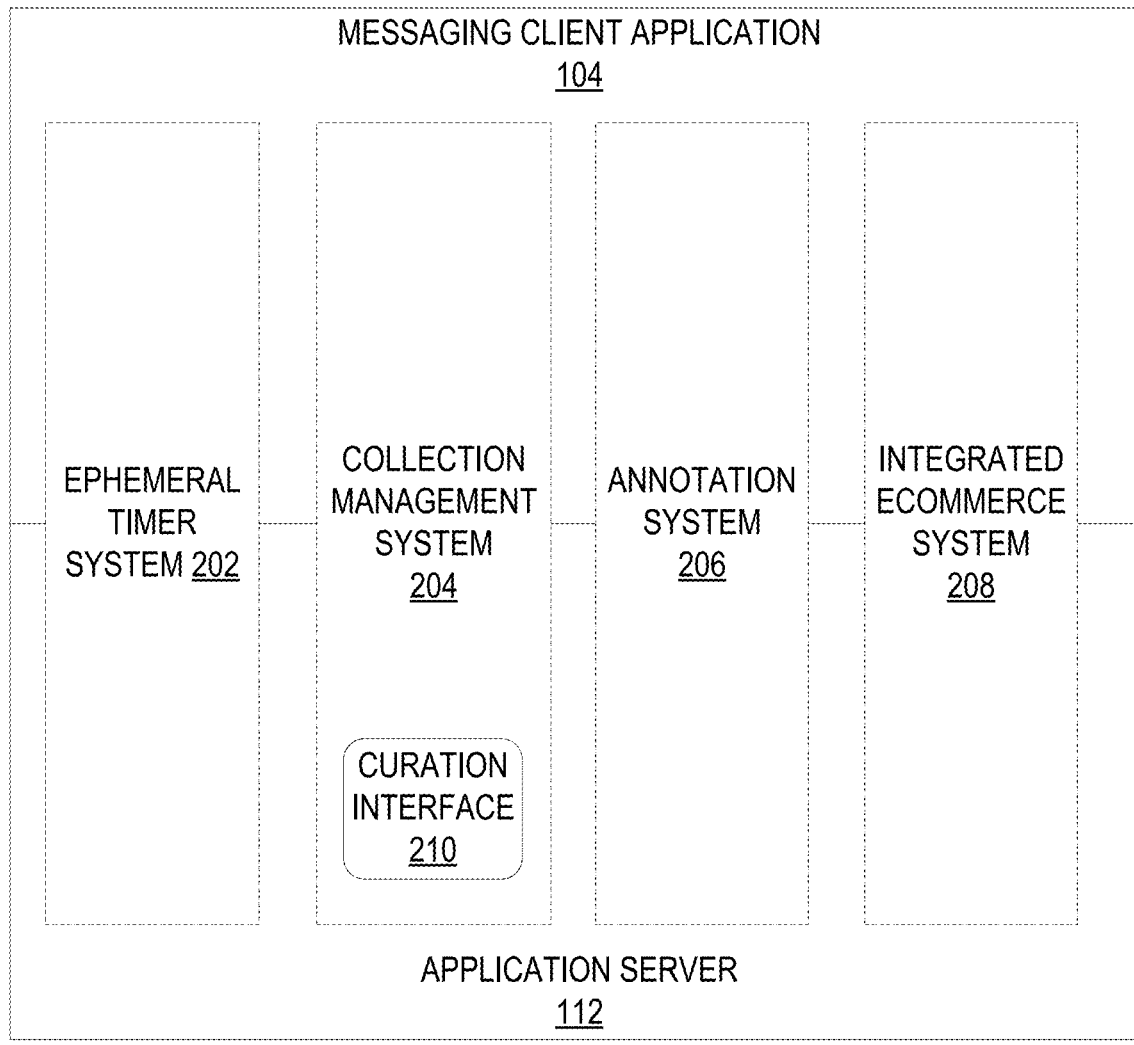
FIG. 2 is block diagram illustrating further details regarding the messaging system, according to some embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of subsystems, namely an ephemeral timer system 202, a collection management system 204, an annotation system 206, and an integrated ecommerce system 208.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story, such as the story component 404 discussed below), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The annotation system 206 provides various functions that enable a user to annotate or otherwise modify or edit media content associated with a message. For example, the annotation system 206 provides functions related to the generation and publishing of media overlays for messages processed by the messaging system 100. For example, the annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another exemplary embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The integrated ecommerce system 208 may facilitate ecommerce transactions using the messaging system 100. In some aspects, the integrated ecommerce system 208 may provide ecommerce capabilities via a native interface of the social networking system 100. The ecommerce capabilities may be provided not only for products offered by a provider of the social messaging system 100, but also for products offered by other entities or organizations not closely associated with the social messaging system 100 (e.g. organizations with completely different ownership than that of the provider of the social messaging system 100). The integrated ecommerce system 208 may accomplish this via implementation of a data driven ecommerce engine. The integrated ecommerce system may provide for importation of data files from multiple product vendors. Each of the import files may provide product information for a plurality of products offered by one of the vendors. An importation process may load a product database of the social messaging system 100 with the product information. Thereafter, the social messaging system 100, via the integrated ecommerce system 208, may offer a native ecommerce solution that is able to provide ecommerce functions for the imported products. Products of several vendors may be similarly imported into the social messaging system 100 via the integrated ecommerce system 208. By providing a native interface to products from multiple outside vendors, the integrated ecommerce system may provide for an improved user experience over other social messaging systems that require a user to transition from a social network interface to a different interface, such as a web interface, to perform ecommerce functions for products not associated with the social networking system itself.

Figure 3A:
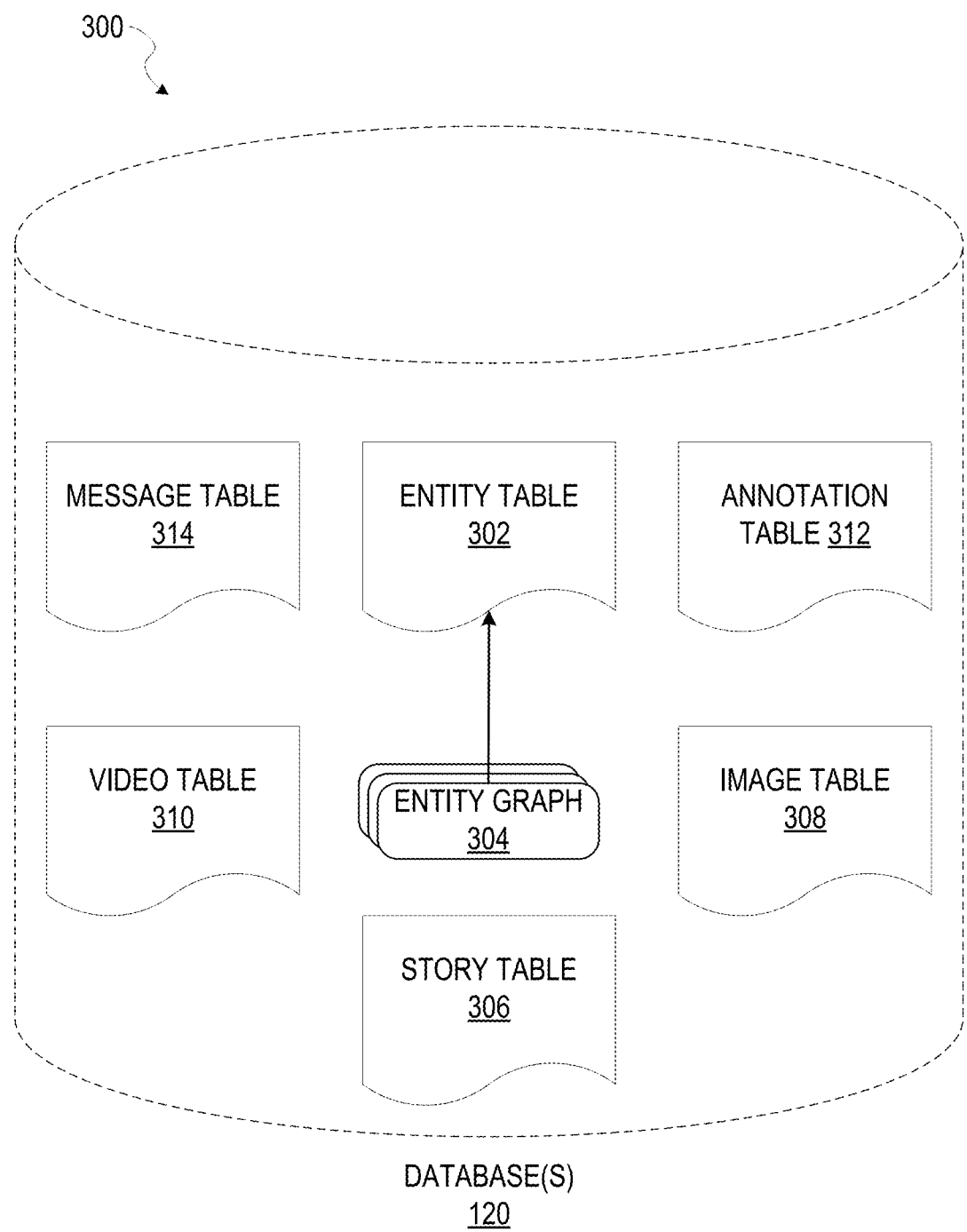
FIG. 3A shows exemplary data bases utilized by the messaging system of FIG. 1.

FIG. 3A is a schematic diagram 300 illustrating data which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 614. An entity table 602 stores entity data, including an entity graph 304. Entities for which records are maintained within the entity table 602 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 608 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT story or a gallery). The creation of a particular collection may be initiated by a particular user (e.g., a user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and who are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3B:
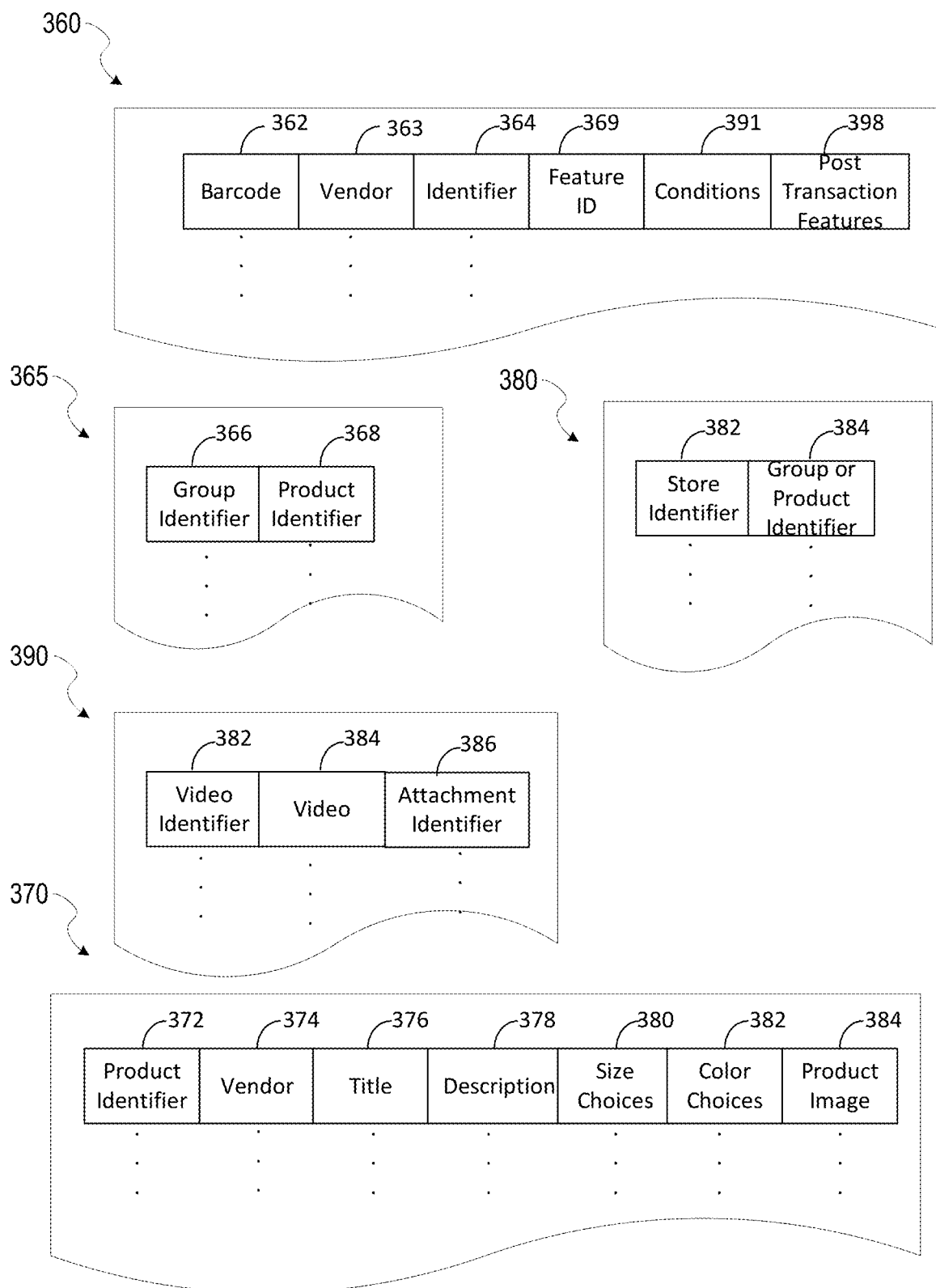
FIG. 3B shows exemplary relational data base schemas that may be utilized by some embodiments of the messaging system of FIG. 1.

FIG. 3B shows exemplary databases that may be utilized in some aspects of the social messaging system 100. FIG. 3B shows a barcode relational database 360. The barcode database 360 may include a plurality of rows, each row identifying a single barcode via a barcode column 362. Each row may also include a vendor column 363 an identifier column 364, a feature identifier column 369, a conditions column 391, and a post purchase features column 398. The vendor column 363 may identify a vendor providing a product identified by the barcode identified in column 362. The identifier 364 may provide a unique identifier for one of a product, group, store, or video. The unique identifier may be identified as one of a product, group, store, or video identifier based on the identifier itself in some aspects. For example, the identified may include unique characters or fall within a numerical range for each of the product, group, store, or video identifiers. If the identifier 364 is a product identifier, it may identify a product identified by the barcode 362. The feature id column 369 may identify a feature to be invoked in response to the barcode 362. The feature id 369 identifies a feature via the feature table 390, discussed below. In some aspects, the conditions column 391 defines zero or more conditions that must be satisfied to respond to the barcode 362. If the zero or more conditions specified by conditions column 391 are not met, no action is taken in response to receiving the barcode. The post purchase features column 398 may identify one or more features (via feature id) available to the user after a purchase occurs in response to the barcode. The features available after purchase may be identified by cross referencing the post purchase features identifiers included in post purchase features 398 with the feature table 390, discussed below. For example, in some aspects, merchants or vendors may offer post-transaction experiences such as use of a lens, filter, or sticker only after a purchase transaction or other transaction.

FIG. 3B also shows a product database 370. Each row of the product database 370 includes a product identifier column 372, vendor column 374, title column 376, description column 378, size choices column 380, color choices column 382, and product image column 384. The product database 370 may store product information for products offered by a provider of the social messaging system 100. The product identifier 372 may be referenced by the identifier 364. The product database 370 may also store product information for products offered by other vendors, not associated with the provider of the social messaging system 100. By integrating the product information, a native user interface of the social messaging system 100 may be utilized to provide ecommerce functions for both products offered by the social network provider, and products offered by other vendors.

FIG. 3B also shows a group database 365, a store database 380, and a video database 390. The group database 365 includes a group identifier column 366 and a product identifier column 368. The group identifier 366 uniquely identifies a group of products. The group identifier 366 may be cross referenced by the identifier 364. In other words, in some aspects, a barcode 362 may be linked to a group of products. The product identifier 368 may cross reference the product identifier 372 of the product database 370. Some aspects may include multiple rows in the group database 365, one row for every product in a particular group.

The store database 380 stores associations between stores 382 and group or product identifier 384. For example, the group or product identifier 384 may cross reference a group identifier, such as group identifier 366, or a product identifier, such as product identifier 372. A store may include one or more groups and/or one or more products. Each row of the store database 380 may represent one product or group included in the store identified by the store id 384.

The video database 390 may store an association between a video identifier 384, data defining the video itself 384, and an attachment, identified via an attachment identifier 386. The attachment identifier may cross reference a group identifier, such as group identifier 366, or a product identifier, such as product identifier 372, or another (different) video 382.

Figure 3C:
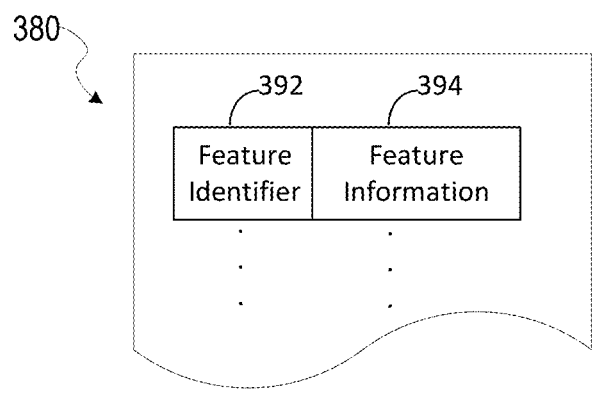
FIG. 3c shows data base schemas that may be utilized by some embodiments of the messaging system of FIG. 1.

FIG. 3C shows one embodiment of the feature database. The feature database 390 includes a feature identifier 392 and feature information 394. The feature identifier 392 may be cross referenced by the feature id 369 of FIG. 3B. The feature information 394 may provide information necessary to invoke a feature of the social network system 116 in response to the barcode 362. For example, in some aspects, in addition to displaying a user interface for a product, group of products, store, or video, a barcode may enable access to a feature. For example, in some aspects, the feature information may identify an image filter that is made accessible to the user as a result of scanning the barcode. In some aspects, the filter may be a geofilter. In some aspects, the filter may be a lens, as described above. As one illustrative example, in some aspects, scanning a snapcode may allow a user to try on a spectacles lens. In some aspects, the spectacles lens may modify an image to show a user wearing glasses. In some aspects, the feature information may identify particular users of the social network 116 that may be added as friends of the user scanning the barcode. A user interface may be presented asking the user whether they wish to add this user as a friend. The friend may then be added in response to receiving input meeting a criteria (such as a "yes" response).

Figure 4:
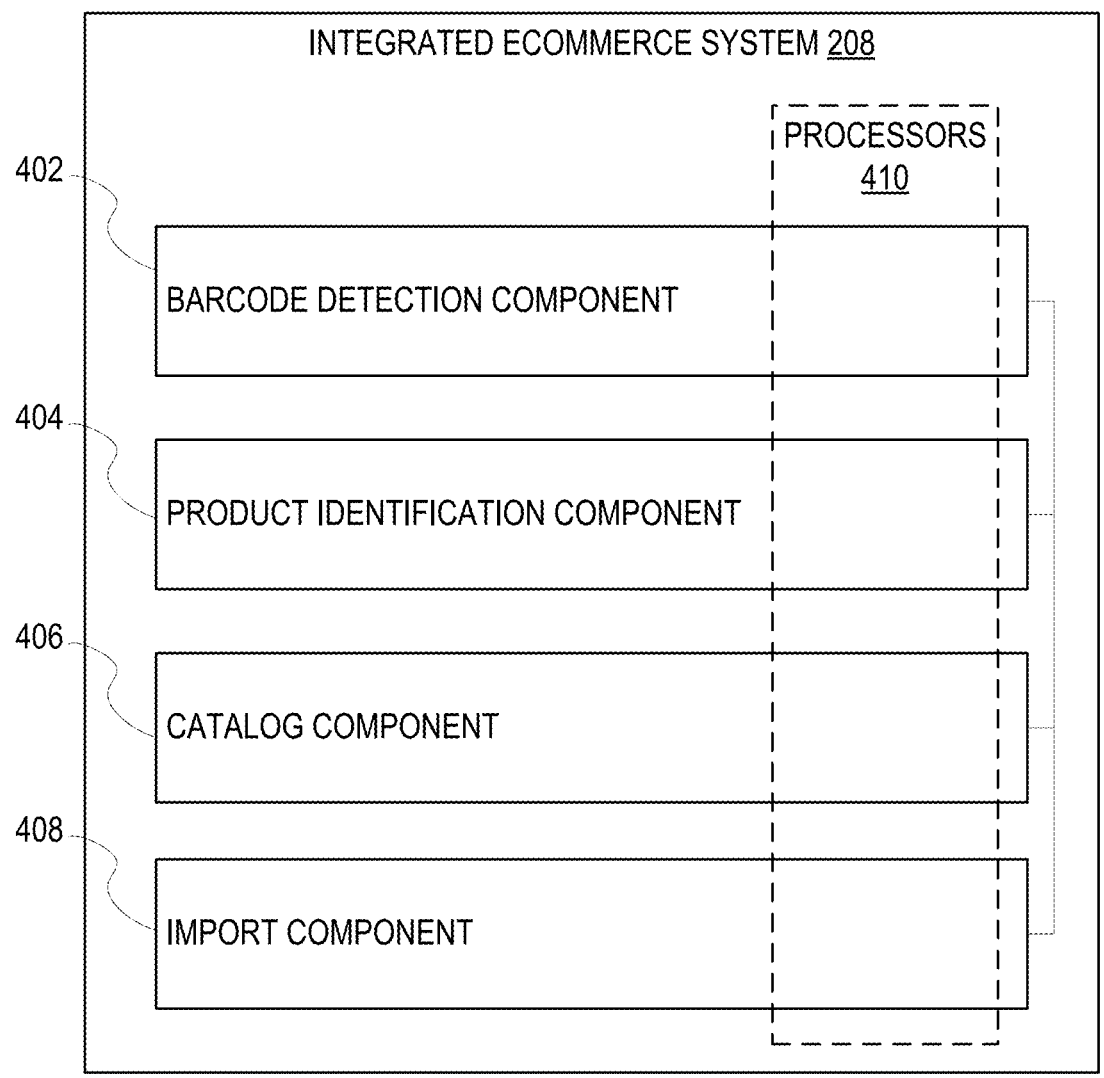
FIG. 4 is an exemplary block diagram illustrating functional components of a content selection system that forms part of the messaging system, according to some example embodiments.

FIG. 4 is a block diagram illustrating functional components of the integrated ecommerce system 208 that forms part of the messaging system 100, according to some example embodiments. To avoid obscuring the inventive subject matter with unnecessary detail, various functional components (e.g., modules, engines, and databases) that are not germane to conveying an understanding of the inventive subject matter have been omitted from FIG. 4. However, a skilled artisan will readily recognize that various additional functional components may be supported by the integrated ecommerce system 208 to facilitate additional functionality that is not specifically described herein. As shown, the integrated ecommerce system 208 includes a barcode detection component 402, a product identification component 404, a catalog component 406, and an import component 408.

The barcode detection component 402 may capture an image with an imaging sensor that may be integrated with a client device 102 in some aspects. The barcode detection component 402 may then analyze the captured image to identify a barcode included in the image. In various aspects, the barcode may take various forms. For example, as discussed above, in the some aspects, the barcode may be a Q/R code. In some aspects, the barcode may be a snapcode, as discussed below. In some aspects, the barcode may be a UPC barcode.

The product identification component 404 may identify a product based on the barcode detected by the barcode detection component 402. For example, the product identification component 404 may search a database that provides a mapping of barcodes to product information.

The catalog component 406 may identify product characteristics for the product identified by the product identification component. For example, the catalog component may search a product catalog that includes detailed information on products. For example, information such as size, color, and availability for a product may be determined by the catalog component 406.

The import component 408 may provide for importation of data define one or more products that can be displayed and purchased via the integrated ecommerce system 208.

The above referenced functional components of the integrated ecommerce system 208 are configured to communicate with each other (e.g., via a bus, shared memory, a switch, or APIs). Collectively, these components facilitate selective presentation of content to users.

As is understood by skilled artisans in the relevant computer and Internet-related arts, each functional component illustrated in FIG. 4 may be implemented using hardware (e.g., a processor of a machine) or a combination of logic (e.g., executable software instructions) and hardware (e.g., memory and the processor of a machine) for executing the logic. For example, any component included as part of the integrated ecommerce system 208 may physically include an arrangement of one or more processors 410 (e.g., a subset of or among one or more processors of a machine) configured to perform the operations described herein for that component. As another example, any component of the content selection system may include software, hardware, or both, that configure an arrangement of the one or more processors 410 to perform the operations described herein for that component. Accordingly, different components of the integrated ecommerce system 208 may include and configure different arrangements of such processors 410 or a single arrangement of such processors 410 at different points in time.

Furthermore, the various functional components depicted in FIG. 4 may reside on a single machine (e.g., a client device or a server) or may be distributed across several machines in various arrangements such as cloud-based architectures. Moreover, any two or more of these components may be combined into a single component, and the functions described herein for a single component may be subdivided among multiple components.

Figure 5:
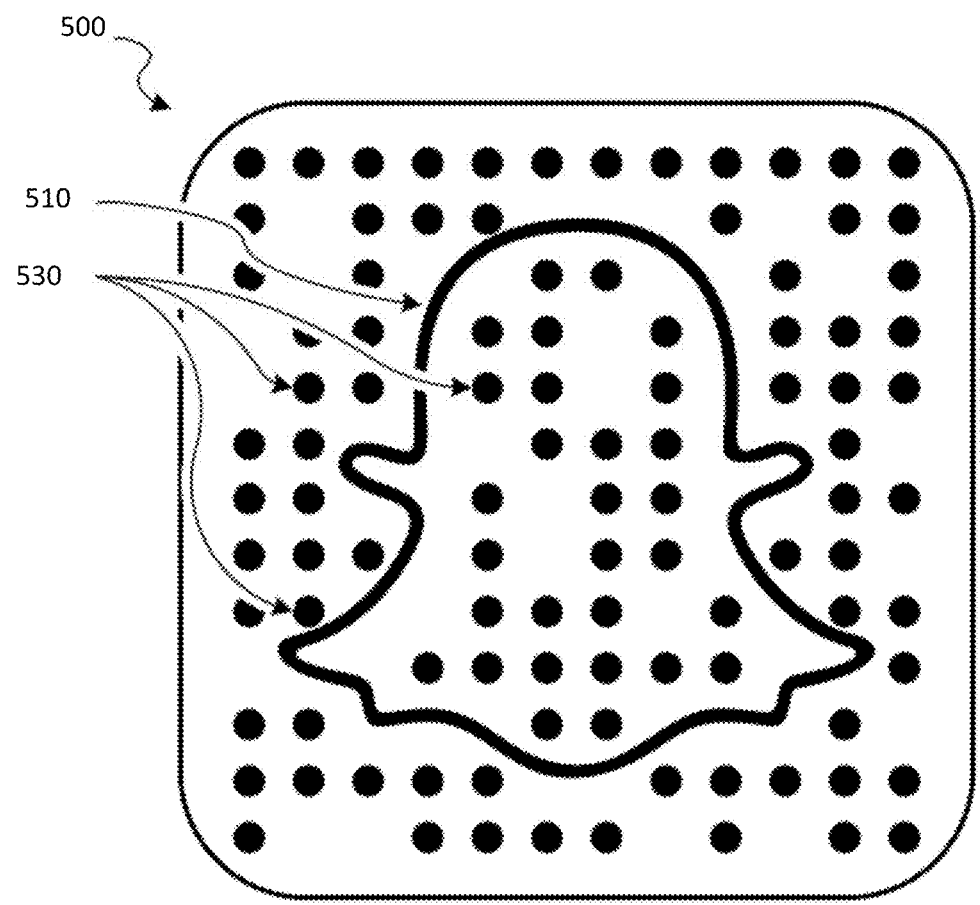
FIG. 5 shows an exemplary barcode.

FIG. 5 shows an exemplary barcode. The exemplary barcode 500 employs a custom graphic for a finder pattern or an alignment pattern (e.g., snapcodes). Barcode 500 that includes a custom graphic 510 (e.g., a company logo), and markings 520 that represent data encoded into the optical barcode. In this example, the custom graphic 510 is a company logo such as the SNAPCHAT® "ghost" logo. It will be appreciated that the SNAPCHAT® "ghost" logo is merely an example custom graphic and other graphics, icons, or symbols can be employed as a finder pattern or alignment pattern using the techniques described herein. Other example custom graphics used as a functional pattern can include designs with multiple paths, multiple polygons, multiple aesthetic elements, or other design features.

In alternative embodiments, the custom graphic 510 may be different from a company logo. The markings 520 are dots that are arranged in a pattern with a particular spacing or positioning readable by a machine. Although the barcode 500 shows the markings 520 as dots, other shapes and marks can be employed (e.g., squares or asymmetric shapes of various geometries). The markings 520 can be arranged in a uniform pattern or a non-uniform pattern. In some instances, the marks can be of different sizes or a uniform size. Additionally, the markings 520 can be in a predetermined arrangement or an arrangement that is dynamically determinable when decoding data from the markings. In some embodiments, the custom graphic 510 and the markings 520 can be surrounded by a bounding shape, such as an outer box 525. Although the outer box 525 of the diagram 500 is shown as a square with rounded corners, the outer box 525 can be in the form of a variety of other shapes with various geometries.

Figures 4, 6:
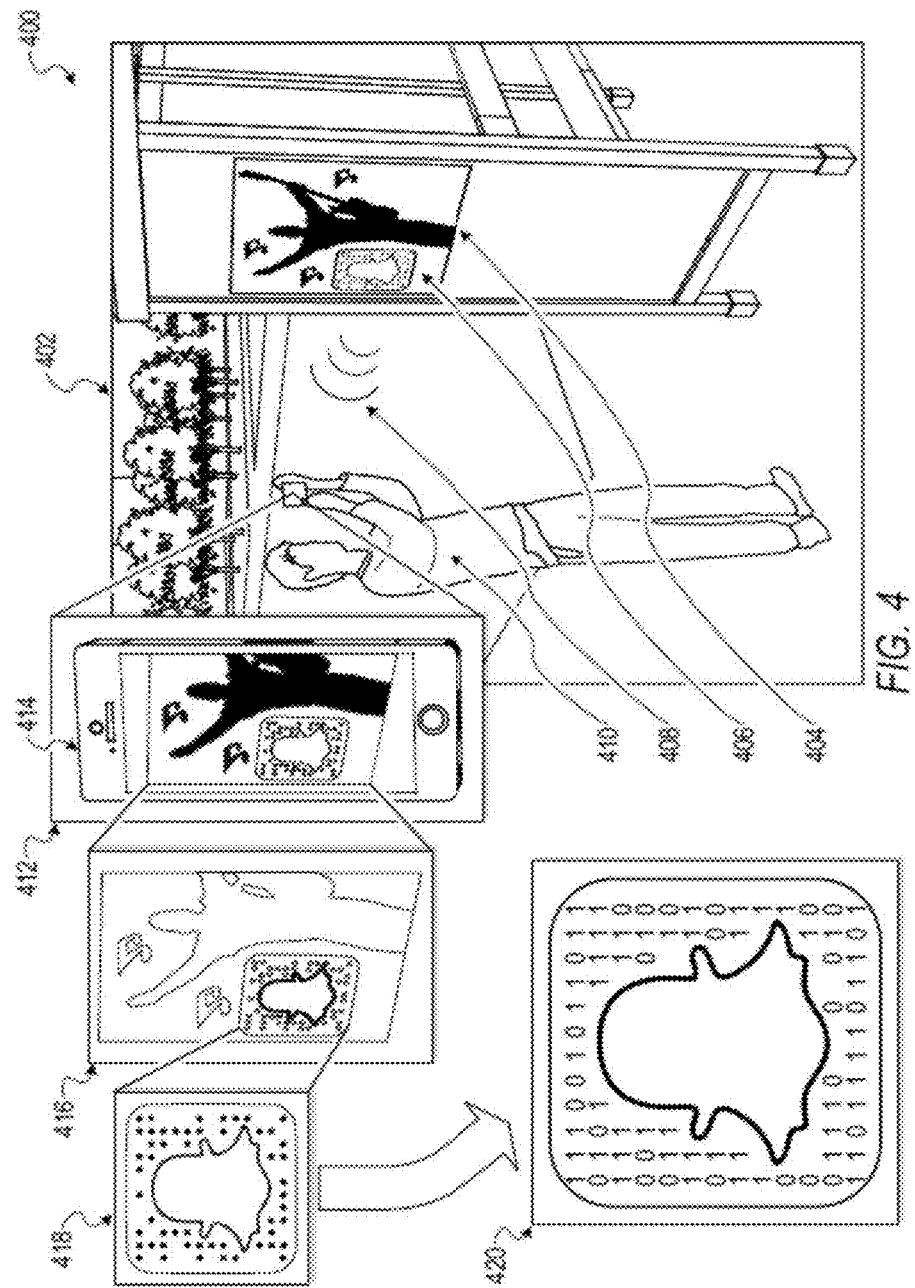
FIG. 6 shows an exemplary use of a barcode to obtain product information.

FIG. 6 shows an exemplary use of a barcode to obtain product information. FIG. 6 is an overview of a particular example embodiment of identifying and decoding an optical barcode to identify a product. In various aspects, the optical barcode may include a custom graphic as discussed above. In the diagram 600, a scene 602 illustrates a poster 604 that includes an optical barcode 606 and a user 610. It will be appreciated that the optical barcode 606 can be displayed in a variety of manners such as on a user device display, a computer display, woven or otherwise affixed to an article of clothing or another product, or included in a variety of printed items. Callout 612 portrays an enlarged view of a portion of the scene 602. The callout 612 includes a client device 102 of the user 610 that includes an optical sensor (e.g., a camera sensor of a smart phone) operable to detect an optical signal 608 of the optical barcode 606.

In an example embodiment, the client device 102 captures an image of the poster 604 that includes the optical barcode 606. The barcode detection component 402 receives the image data representing the image from the client device 102. In this example embodiment, the barcode detection component 402 is included in the client device 102 (e.g., an application executing on a smart phone of the user 410), although in other example embodiments, the barcode detection component 402 can reside on a server (e.g., a server of the social messaging system 100) that is communicatively coupled with the client device 102. Callout 616 portrays example image processing performed by the barcode detection module 402 to identify the barcode 606 in the image.

Figure 7:
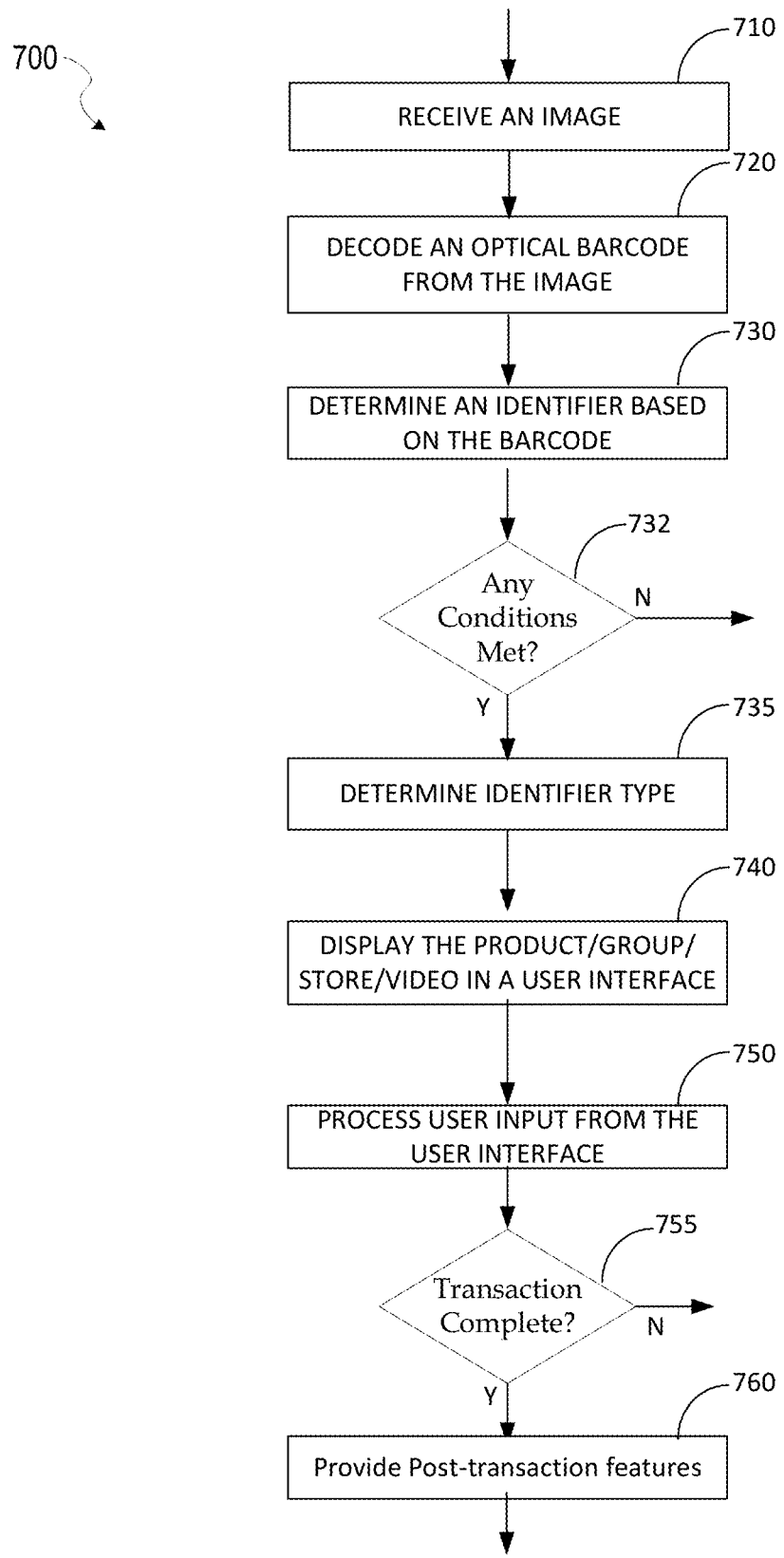
FIG. 7 is a flowchart of an exemplary method of receiving input from a product user interface.

FIG. 7 is a flowchart of an exemplary method of receiving input from a user interface. The process 700 discussed below may be performed in some aspects, by the processors 410 discussed above with respect to FIG. 4. In some aspects, the processors 410 may be equivalent to the processing unit 2254, discussed below with respect to FIG. 22, and/or the processor(s) 2310, discussed below with respect to FIG. 23. In some aspects, instructions stored in an electronic memory may configure the processors to perform one or more of the functions discussed below. For example, in some aspects, the memory 2306 may store the instructions. In some aspects, the instructions may be included in the integrated ecommerce system 208, discussed above with respect to FIGS. 2 and 4. For example, the instructions may be included in one or more of the barcode detection component 402, product identification component 404, and/or catalog component 406.

In block 710, an image is received. For example, in some aspects, an image including an optical barcode or a SnapCode may be received in block 710. In some aspects, the image may be received from a client device. In other aspects, process 700 may be performed by a client device 102, and the image may be received from an image sensor of the client device 102.

In block 720 an optical barcode is decoded from the image. In some aspects, the optical barcode may be included in a SnapCode, for example, as shown above with respect to FIG. 5.

In block 730, an identifier is determined based on the barcode. For example, in some aspects, a database or other storage may store associations between barcodes and identifiers. As shown in the database 360, the barcode 362 may be associated with an identifier 364 by both being included in a single row of the database 360.

Decision block 732 determines whether any conditions associated with the barcode are met. For example, in some aspects, a barcode may only be used within a certain radius of a geographic location. Thus, if such a condition is linked to this barcode, for example, via the conditions column 391, block 732 may determine a geographic location of the device generating the image received in block 710. The determined geographic location may then be compared to the geographic location specified in the condition. If the geographic location of the device meets criteria specified by the condition, process 700 may move from decision block 732 to block 735. In some aspects, the geographic location of the device may be determined using GPS receiver integrated with the client device 102. In other aspects, an Internet Protocol (IP) address of the device may be used to identify an approximate geographic location of the client device 102. In some other aspects, conditions linked to a barcode may require a current time to be within a predetermined time range in order for the barcode to be active. In these aspects, the condition 391 for the barcode may obtain a current time at the device providing the image of block 710, and determine if the time is within a threshold time of a specified time. If the condition is met, process 700 moves from decision block 732 to block 735. Otherwise, processing may continue via the "No" branch of decision block 732.

In block 735, a type of the identifier is determined. For example, the identifier mapped to the barcode may identify a product, a group of products, a store, or a video in various aspects. As discussed above, the type of the identifier may be determined via predetermined rules. For example, if the identifier is a numerical value, different ranges of values may be utilized for the different types of identifiers. Alternatively, predetermined sequences of alpha or other characters may uniquely identify particular types of identifiers.

In some aspects, the identifier may be identified to be a product identifier. In this case, the identifier 364 decoded in block 720 may be used to search the product database 370 to identify one or more characteristics, such as a product description 378, product options, such as a choice of sizes 380 for the product, or a choice of color 382 for the product.

In some other aspects, the identifier may be identified as a group identifier. In this case, the identifier 364 may be utilized to search the group database 365 in some aspects to identify products included in the group.

In some aspects, the identifier may be identified as a store identifier. In this case, the identifier 364 may be utilized to search the store database 380 to identify products and/or groups of products included in the store.

In some aspects, the identifier may be identified as a video identifier. In this case, the identifier 364 may be utilized to search the video database to identify a video mapped to the barcode.

In block 740, information relating to the product/group/store/or video is displayed in a user interface. For example, if the barcode maps to a product identifier, a title of the product may be displayed, for example, based on the title 376 of the product database 370. In some aspects, an image of the product may be displayed based on the product image 384 stored in the product database 370. The description 378 may also be displayed in some aspects. In some aspects, the size choices 380 and/or color choices 382 may also be displayed in the user interface. In various aspects, block 740 may display any of the exemplary user interfaces shown below with respect to any of FIGS. 8-20.

In some aspects, if the barcode maps to a store identifier, a store user interface for the store may be displayed. For example, the store user interface may display information for a variety of products available in the store (e.g. as defined by the store database 380 in some aspects). The store user interface may also display store information, such as vendor name, and contact information.

In some aspects, if the barcode maps to a group identifier, a product group user interface may be displayed. For example, in some aspects, a product group user interface may display products within the group as defined by the group database 365.

In some aspects, if the barcode maps to a video, a video user interface may be displayed. The video user interface may allow a user to play a video, and in some aspects, to display a video attachment. For example, a video user interface may, in some aspects, allow a user to play a video as defined by the video 384, and display attachments defined by the attachment identifier 386. In some aspects, the attachment identifier may identify a product or a store or a group, or another video.

In block 750, input from the user interface is processed. In some aspects, the input may be provided via the user interface displayed in block 740. For example, in some aspects, input selecting one of the size or color may be received. The input may be utilized to transmit a purchase request for the product having the selected size and/or color in some aspects. In some aspects, block 750 may include grouping multiple products into a shopping cart or shopping bag.

In some other aspects, the multiple products may be identified via multiple corresponding barcodes. For example, a user may scan a first barcode, a first product may be identified based on the first barcode, and the first product may be associated with a shopping cart or shopping bag based on user input, for example, input selecting a purchase button or other indication. A second barcode may then be scanned and identified. A second product may be identified based on the second barcode, and added to the shopping cart or bag based on second user input. The two products are now associated via the shopping bag or cart. An ecommerce transaction may then be performed in some aspects based on the contents of the cart or bag. Thus, the ecommerce transaction, in some aspects, may be performed on at least the first and second products based on their association with the shopping cart or bag.

In some aspects, data derived from a transaction performed based on the first and second items may be included in an ephemeral message. For example, as discussed above, the ephemeral message may be deleted after a predetermined amount of time elapses after the message is generated or transmitted. The message may include, for example, one or more of images of the first and second items, descriptions of the first and second items.

Block 755 determines is a transaction has been completed. For example, block 755 may determine if a purchase transaction resulted from the barcode identified in block 730. A purchase resulting from the barcode may be defined as a purchase made in a user interface that is displayed in response to the barcode. The user interface may not be a single user interface, but may be a series of user interfaces within a user interface flow. For example, if the barcode results in a product page being displayed, and the product is added to a shopping cart. The user may then continue shopping, but eventually returns to the cart and makes a purchase, this would be an example of a purchase resulting from the barcode. If the shopping cart is abandoned or otherwise cleared, and the product is later purchased via another means unrelated to the barcode, then this purchase would not be resulting from the barcode.

If the transaction resulting from the barcode is complete, process 700 moves to block 760, which provides post transaction features. For example, as discussed above with respect to post transaction features 398, features may be made available to a user as a reward for purchasing in response to a barcode. These features may include filters, lens, stickers, or any social networking feature. In some aspects, these features may include an ability to friend one or more particular social network users. For example, in some aspects, a store managed by a celebrity may provide for a social network user to friend the celebrity in the social network 116 in response to making a purchase at the store. In some aspects, post transaction features may include offering discounts to users if a number of purchases reaches a predetermined threshold. These discounts may be offered, in some aspects, after every n number of purchases, with n being predetermined. In some aspects, other discounts may be offered to a user after x number of scans of a barcode. For example, some aspects of block 735 above may count a number of barcodes scanned by a user, and compare the number to x (or divide by x and determine a remainder).

Figure 8:
FIG. 8 is an exemplary product page
Figure 9:
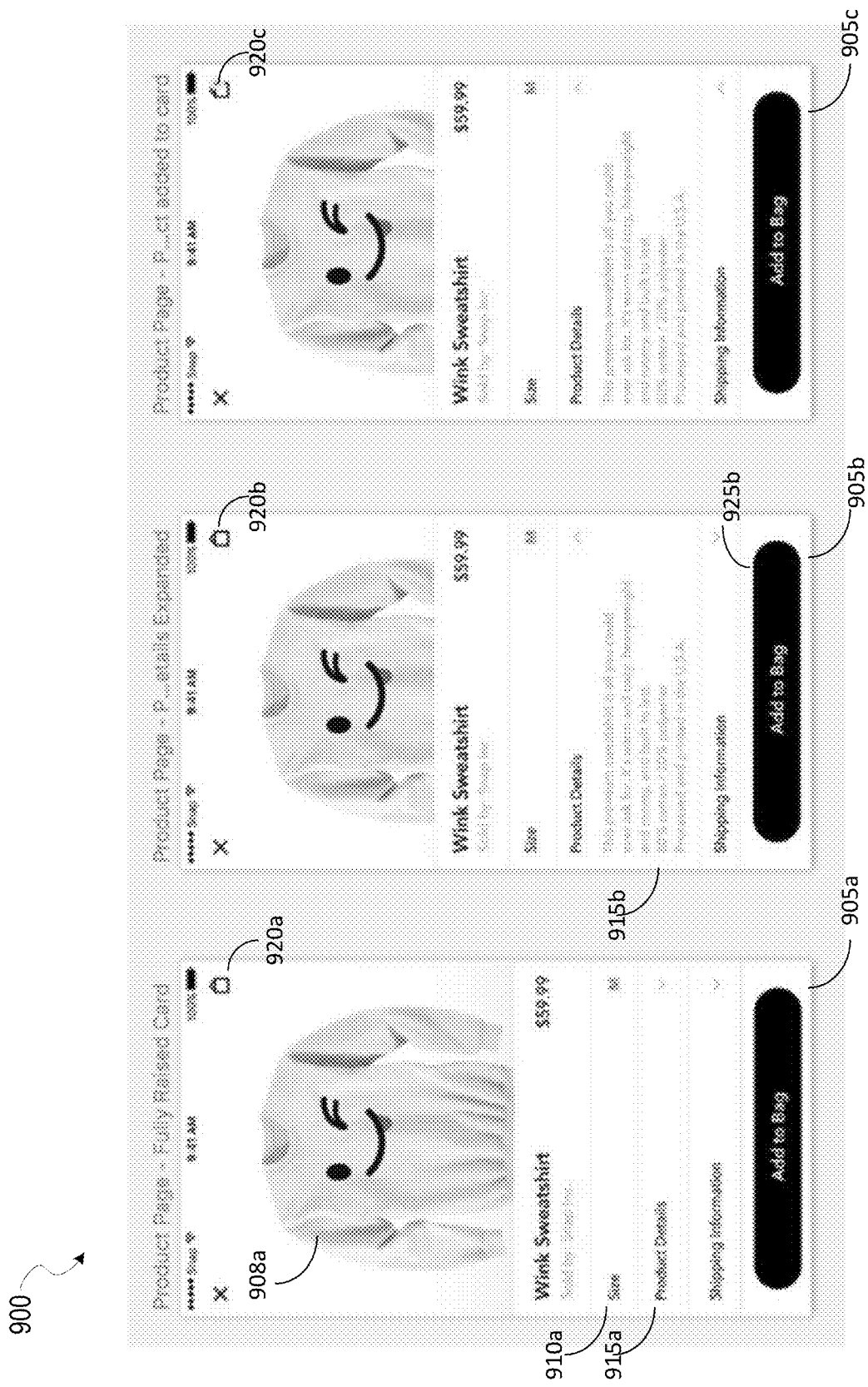
FIGS. 9A-C are exemplary product details pages.

FIG. 8 is an exemplary product page. The exemplary product page includes a product image 805, a product title 810, and a button 815 to provide for display of additional product details. For example, in the aspect illustrated by FIG. 8, selection of the button 815 may display color choices and/or size choices for the product displayed in the user interface 800. The exemplary user interface 800 also displays a price 820 for the product.

FIGS. 9A-C are exemplary product details pages. Exemplary pages 905a-c show product detail pages after a selection of various features. FIG. 9A shows product details page 905a. The product details page 905a includes a product image 908a, size indication 910a, a collapsed product details region 915a, a cart icon 920a. In some aspects, the product image 908a may be based on the product image 384 of the database 370.

FIG. 9B shows an embodiment of the product details page 905b with an expanded product details region 915b. A user may transition from the collapsed product details region 915a to the expanded product details region 915b by selecting the region 915a in some aspects. Product details page 905b also shows a bag icon 920b. Product details page 905b also includes an "add to bag" button 925b. Selection of the "add to bag" button 925b may cause the displayed product to be added to a virtual shopping bag. The virtual shopping bag may provide a list of products to be purchased in a later purchase user interface.

FIG. 9C shows an embodiment of the product details page 905c. In particular, FIG. 9C shows the product details page 905c after selection of the add to bag button 925b in product details page 905b of FIG. 9B. As shown, the bag icon 920c has changed to reflect that the product represented by the product image 908a in the product details page 905a has been stored in the virtual shopping bag.

Figure 10:
FIG. 10 is an exemplary product details page.

FIG. 10 is an exemplary product details page. The product details page 1005 shows a size selection control 1010. The product details page 1005 also shows an "add to bag" button 1015. In some aspects, the "add to bag" button 1015 may be greyed out until a size is selected via the size selection control 1010.

Figure 11:
FIG. 11 is an exemplary product size selection page.

FIG. 11 is an exemplary product size selection page. The product size selection page 1105 may be displayed after selection of the size selection control 1010 of FIG. 10. The product size selection page 1105 includes four size selections 1110a-d. Selection of any one of the size selections 1110a-d may enter the selected size into a product details page, such as any of the product details pages 905a-c shown in FIGS. 9A-C, or the product details page 1205, shown below with respect to FIG. 12.

Figure 12:
FIG. 12 is an exemplary product selection page.

FIG. 12 is an exemplary product selection page. The product details page 1205 of FIG. 12 shows a medium size selection 1210. The medium size selection 1210 may occur in response to a selection of the medium size selection 1110b shown in FIG. 11.

Figure 13:
FIG. 13 shows an exemplary review order page.

FIG. 13 shows an exemplary review order page. The review order page 1305 may be displayed in response to a selection of the shopping bag icon, such as any of the shopping bag icons 920a-c shown in FIGS. 9A-C respectively. The exemplary review order page 1305 shows two products 1310a-b included in the order being reviewed. The review order page 1305 also shows the prices of each of the products 1310a-b as 1320a-b respectively. A subtotal 1330 for items in the order is also shown. Selection of a checkout button 1340 may move the user to a check out user interface, such as that shown in FIG. 14, discussed below, in some aspects.

Figure 14:
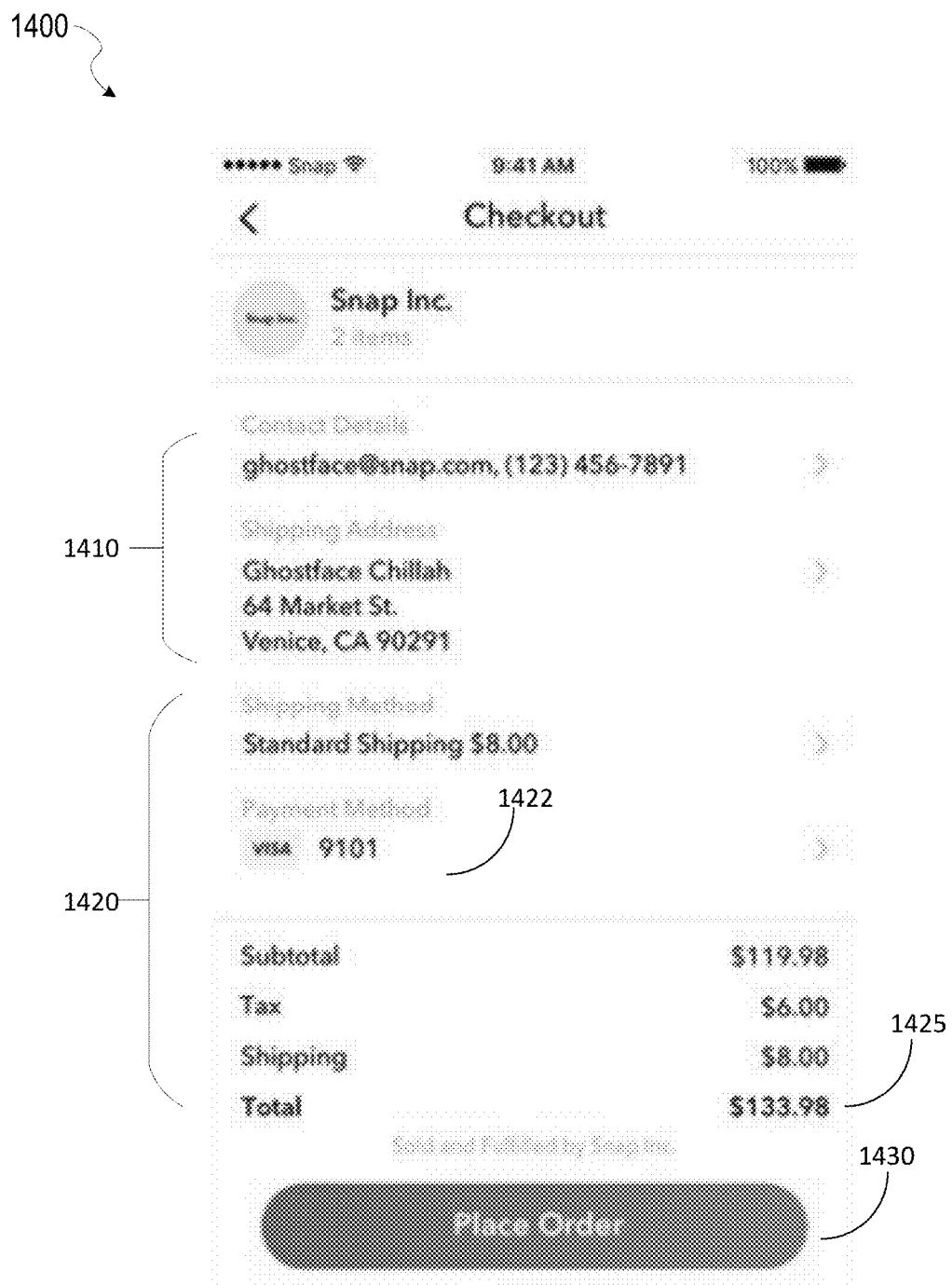
FIG. 14 shows an exemplary check out user interface.

FIG. 14 shows an exemplary check out user interface. The illustrated check out user interface 1405 includes contact details 1410, and payment information 1420. Payment information 1420 includes a payment method 1422 and a payment amount 1425. Selection of a "place order" button 1430 may initiate payment of the payment amount 1425 based on the payment method 1422.

Figure 15:
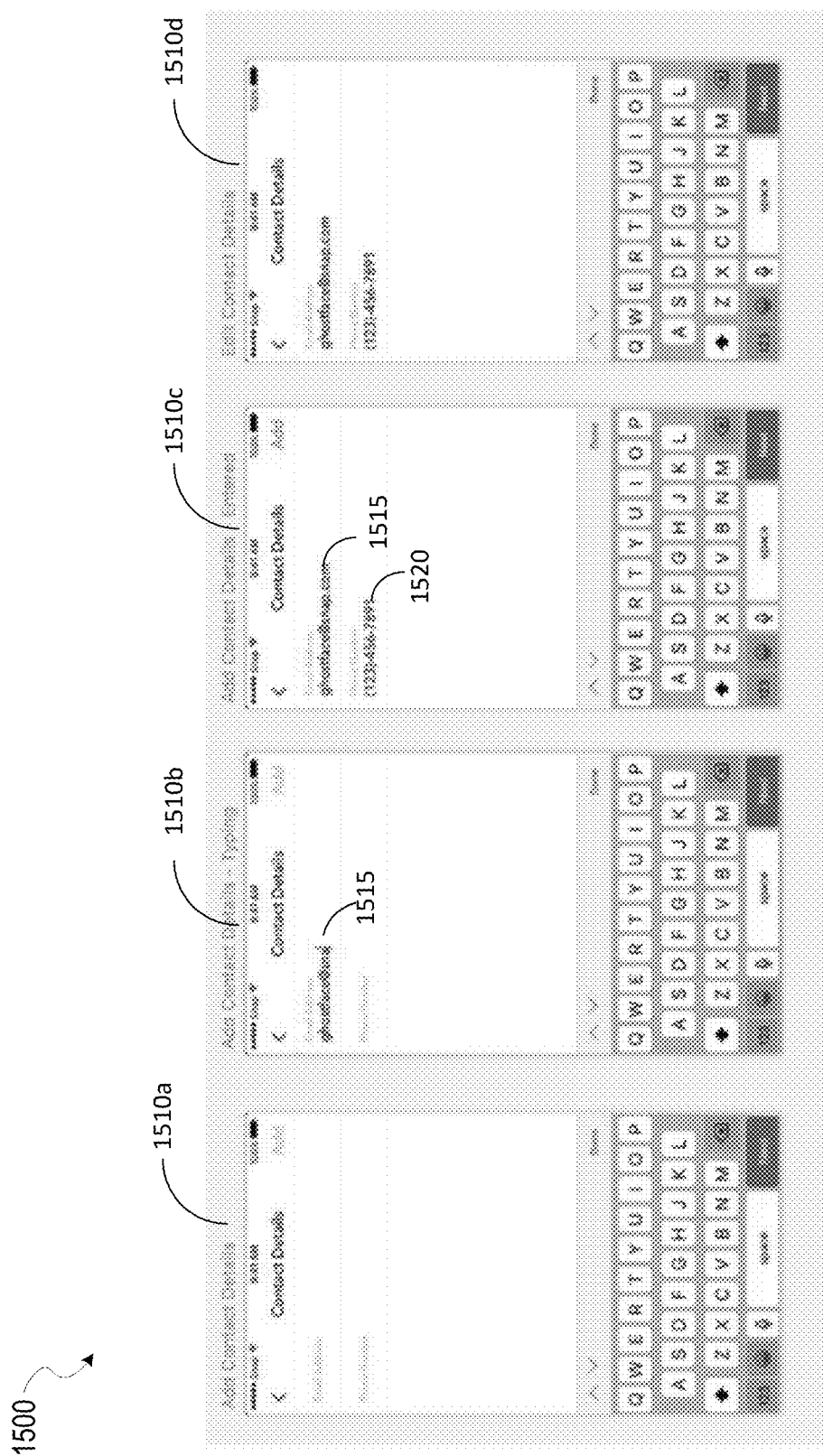
FIG. 15 shows versions 1510*a-d* of a contact details page as contact information is entered.

FIG. 15 shows exemplary versions 1510a-d of a contact details page 1500 as contact information is entered. The first version 1510a shows a blank contact details page. A second version 1510b shows the contact details page 1505 during entry of an email address 1515. A third version 1510c shows the contact details page 1505 after entry of the email address 1515 and a phone number 1520. A fourth version 1510d shows the contact details after entry of a contact based on the email address 1510 and phone number 1520.

Figure 16:
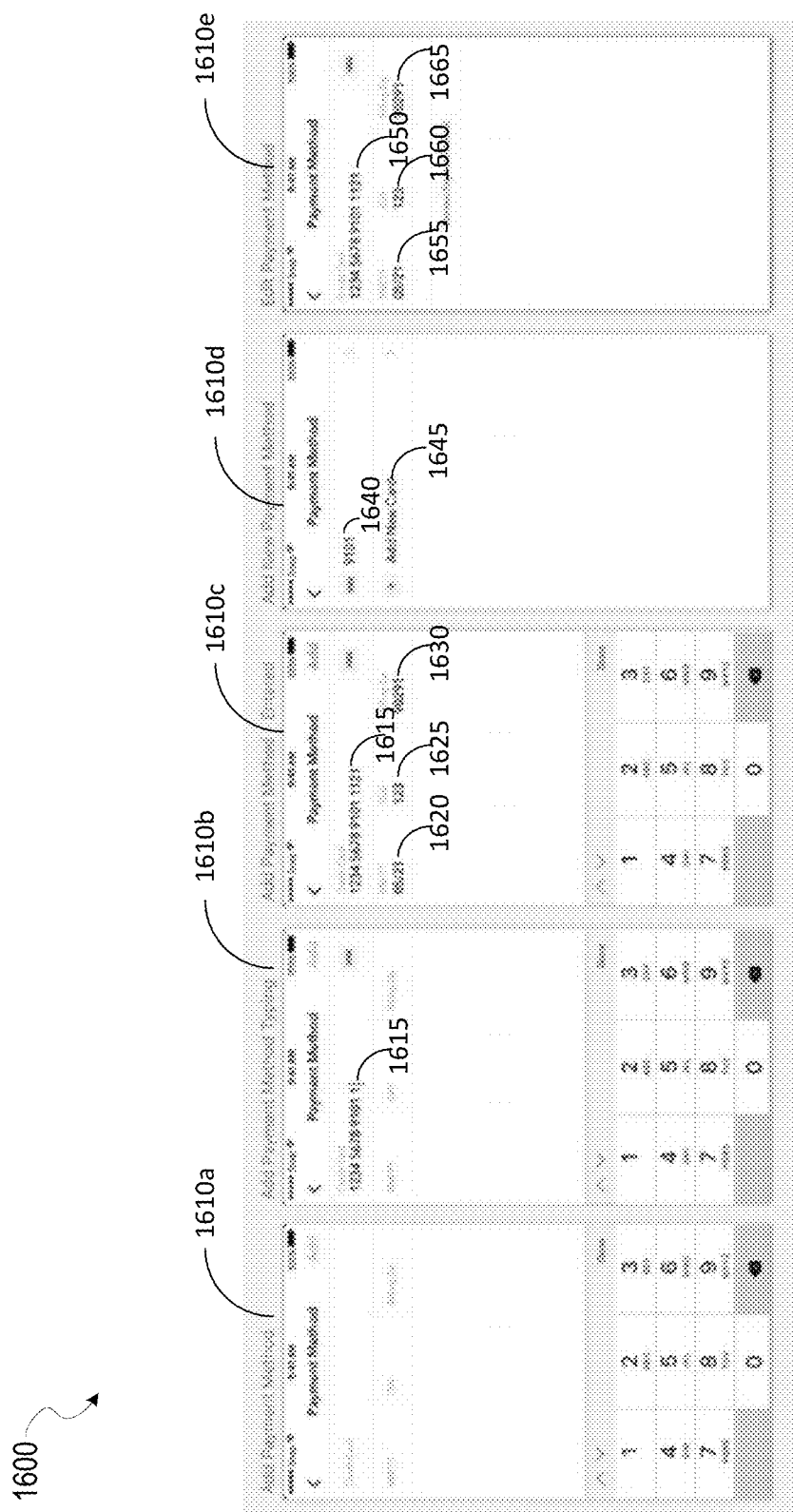
FIG. 16 shows various versions 1605*a-d* of a billing page.

FIG. 16 shows various versions 1605a-d of a billing page 1600. Version 1610a shows an empty billing information page 1600. Version 1610b shows the billing information page 1600 after entry of credit card information 1615 has begun. Version 1610c shows the billing information page 1600 after credit information 1615 has been entered. In addition, version 1610c shows the billing information page 1600 after entry of an expiration date 1620, cw value 1625 and a billing zip code 1630. Version 1610d shows the billing information page 1600 after entry of information for a credit card. Summary of the credit card information 1640 is shown. An add new card control 1645 is also shown. Version 1610e shows another version of the billing information page 1600. In the version 1610e, detailed billing information such as a credit card number 1650, expiration date 1655, cw number 1660, and billing zip code 1665 are shown.

Figure 17:
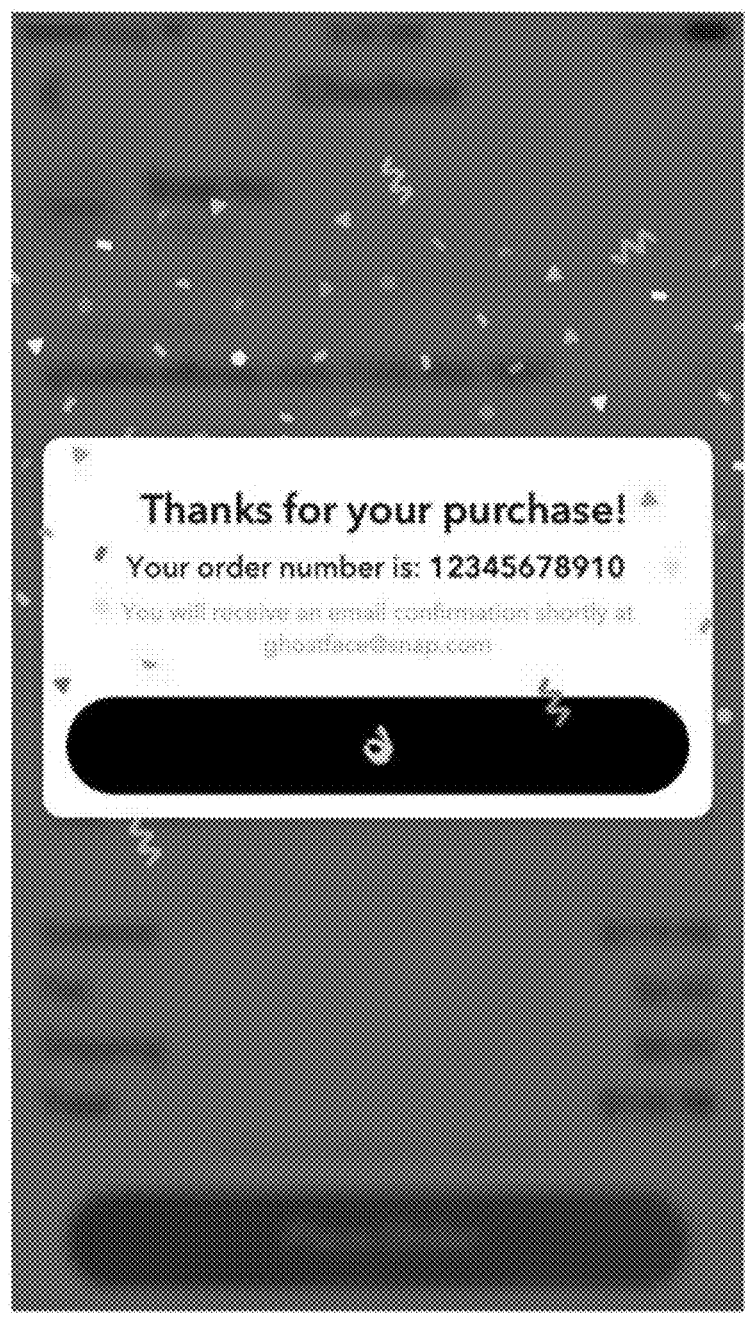
FIG. 17 shows a purchase user interface.

FIG. 17 shows a purchase user interface. The purchase user interface 1700 displays an order number 1705. The purchase user interface 1700 may be displayed in response to selection of the place order button 1430, discussed above with respect to FIG. 14.

Figure 18:
FIG. 18 shows an alternate embodiment of a product page

FIG. 18 shows an alternate embodiment of a product page. The product page 1800 of FIG. 18 provides a view product button 1805 for a product 1808. When selected, the "view product" button 1805 may cause a product details page, such as any of the product details pages 905a-c of FIGS. 9A-C respectively to be displayed. The product page of FIG. 18 also includes a "view store" button 1810. Selection of the "view store" button 1810 may display a page showing other products offered by the entity providing the product 1808.

Figure 19:
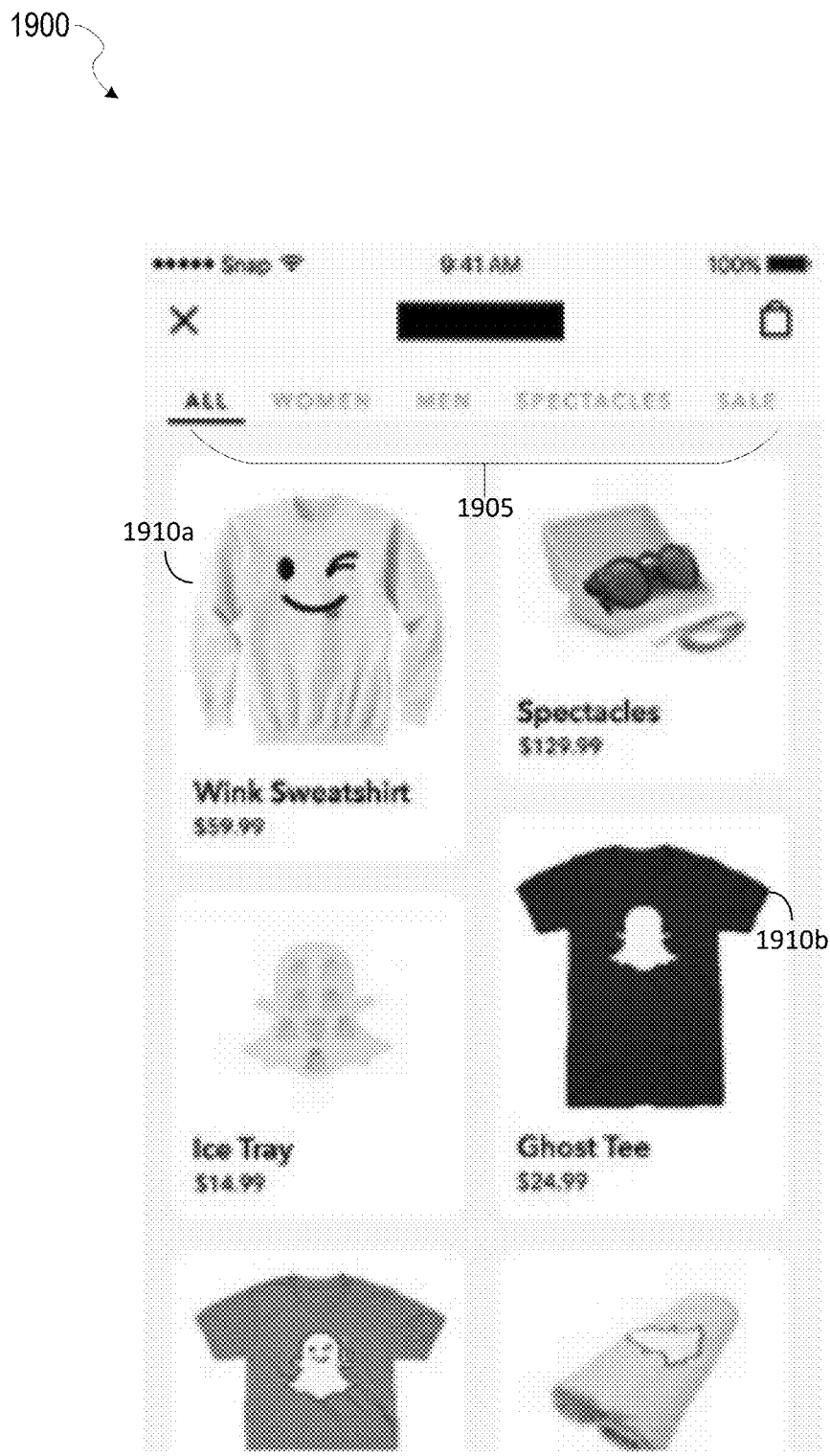
FIG. 19 shows an exemplary store page.

FIG. 19 shows an exemplary store page. The store page 1900 may be displayed, in some aspects, upon selection of the "view store" button 1810 discussed above. The store page 1900 includes a category selection control 1905. The category selection control 1905 may provide for selection of products in a particular category. The store page 1900 also includes a products region 1910. The products region 1910 may display a plurality of product images, such as product images 1915a-b. Selection of a product image 1915a-b may display a product details page for the product represented by the selected product image.

Figure 20:
FIG. 20 shows a product details page.

FIG. 20 shows an exemplary product details page 2000. The product details page 2000 may be displayed in response to selection of the product image 1915b of FIG. 19.

Figure 21:
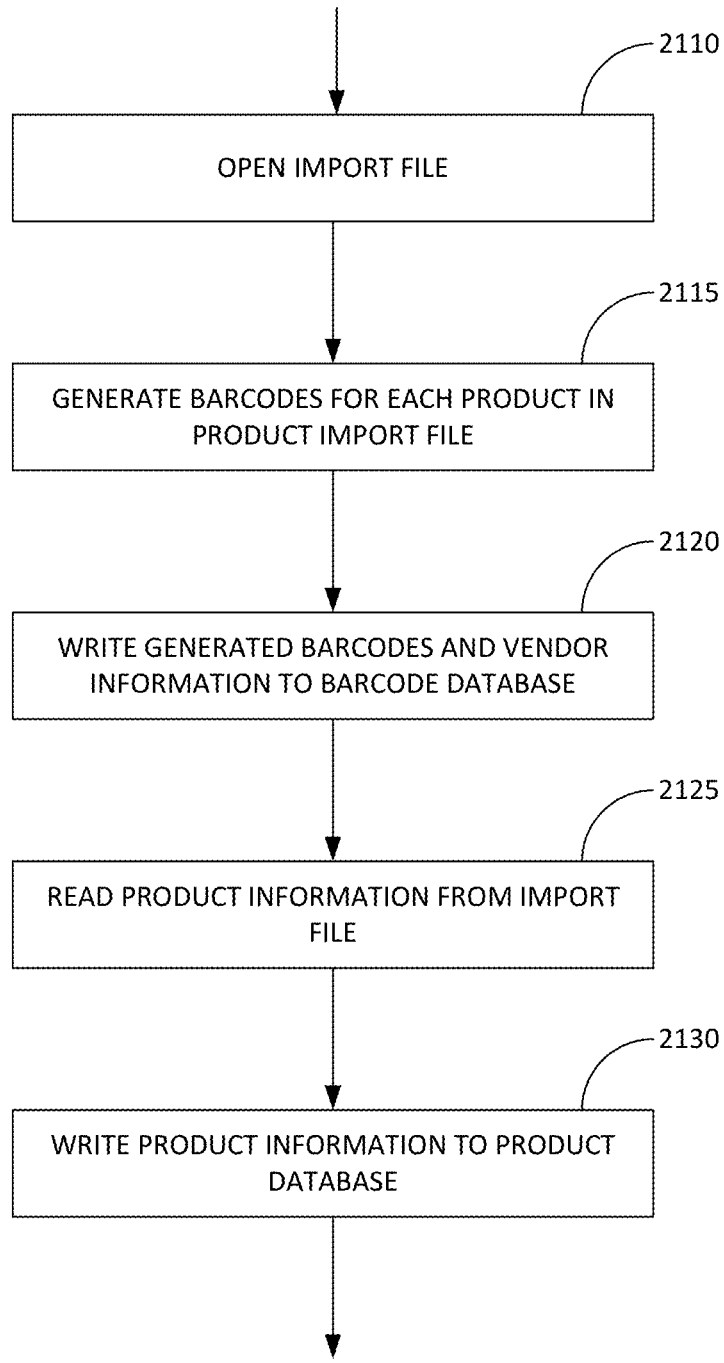
FIG. 21 is a flowchart of an exemplary method of populating a database.

FIG. 21 is a flowchart of an exemplary method of populating a database. The process 2100 discussed below may be performed in some aspects, by the processors 410 discussed above with respect to FIG. 4. In some aspects, the processors 410 may be equivalent to the processing unit 2254, discussed below with respect to FIG. 22, and/or the processor(s) 2310, discussed below with respect to FIG. 23. In some aspects, instructions stored in an electronic memory may configure the processors to perform one or more of the functions discussed below. For example, in some aspects, the memory 2306 may store the instructions. In some aspects, the instructions may be included in the integrated ecommerce system 208, discussed above with respect to FIGS. 2 and 4. For example, the instructions may be included in the import component 408.

In block 2104, input is received requested a database load for a vendor. For example, in some aspects, the input may be received from a user interface that provides for an import file to be identified. The import file may include data defining one or more products. The products may be offered by a particular vendor.

In block 2110, a product import file is opened. For example, in some aspects, a file may be received in block 2104 that includes product records. Each of the product records may be for products offered by a particular entity, such as a vendor. Each of the product records may, in some aspects, include fields corresponding to those of the product database 370. In some aspects, each product record may not include the vendor field 374, but may include a product identifier, a title, a product description, a list of size choices, a list of color choices, and a product image.

In block 2115, barcodes are generated for each product in the product import file. In block 2120, the generated barcodes and vendor information is written to a barcode database. For example, in some aspects, block 2115 populates entries in the barcode database 360. For example, the generated barcodes may be written to the barcode column 362, and/or vendor information may be written to the vendor column 363 for each of the generated barcodes. In some aspects, the vendor information includes a vendor identifier, which uniquely identifies a particular vendor offering products within the product import file. In some aspects, block 2120 may read product identifiers from the product import file and populate the product identifier column 364 of the barcode database based on the product identifiers in the import file. In some aspects, a combination of the vendor information and product identifier 364 may uniquely identify a product across all vendors, with the vendor information functioning to uniquely identify products when two or more products from different vendors have identical product identifiers.

In block 2125, product information is read from the product import file. As discussed above, this product information may include one or more product images, product descriptions, product option specifiers such as a list of possible colors, a list of possible sizes, product prices, product availability information, product titles, or other product information.

In block 2130, the product information is written to a product database, such as product database 370, discussed above with respect to FIG. 3B.

Software Architecture

Figure 22:
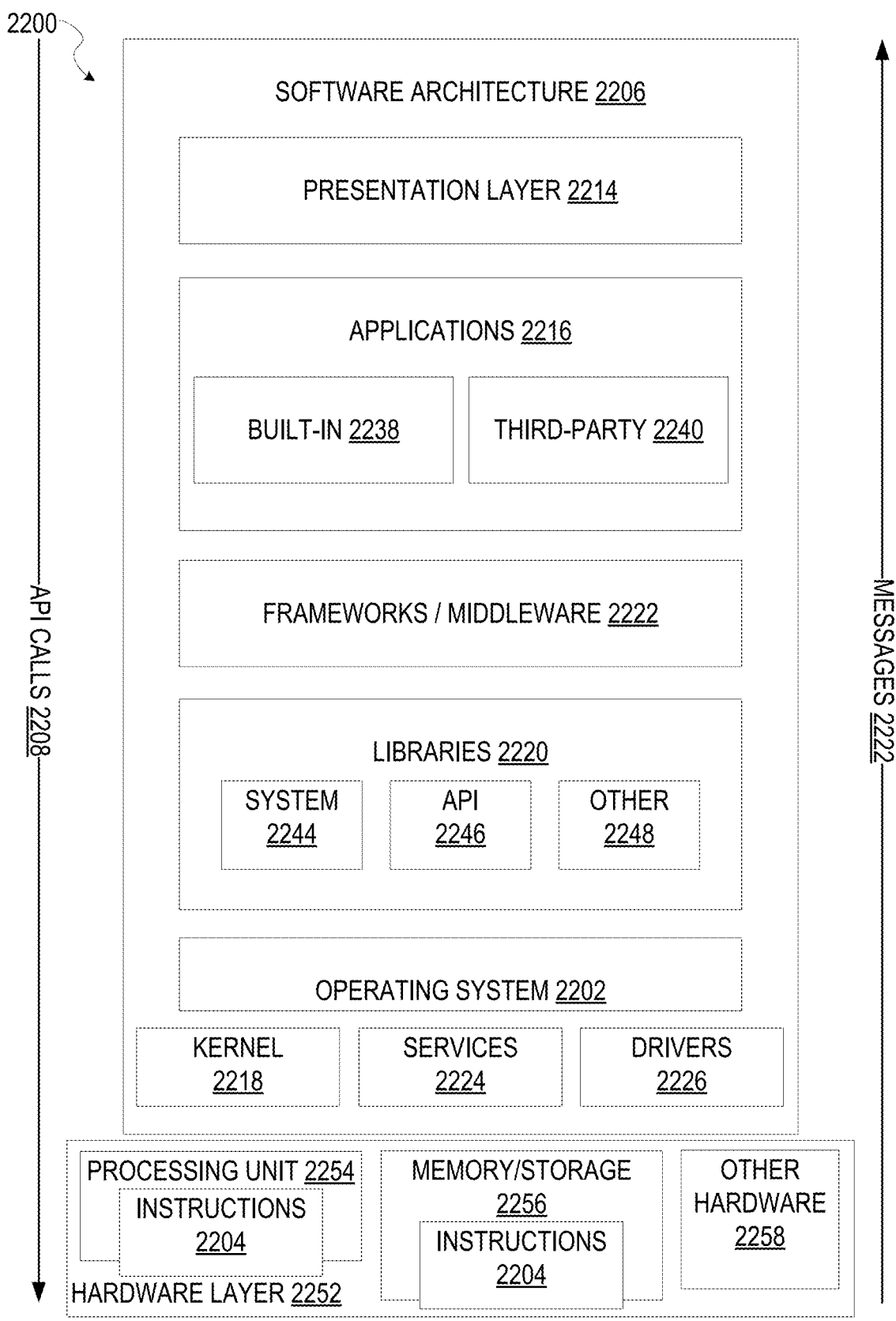
FIG. 22 is a block diagram illustrating an example software architecture

FIG. 22 is a block diagram illustrating an example software architecture 2206, which may be used in conjunction with various hardware architectures herein described. FIG. 22 is a non-limiting example of a software architecture and it will be appreciated that many other architectures may be implemented to facilitate the functionality described herein. The software architecture 2206 may execute on hardware such as a machine 2300 of FIG. 23 that includes, among other things, processors 2204, memory/storage 2206, and I/O components 2218. A representative hardware layer 2252 is illustrated and can represent, for example, the machine 2300 of FIG. 23. The representative hardware layer 2252 includes a processing unit 2254 having associated executable instructions 2204. The executable instructions 2204 represent the executable instructions of the software architecture 2206, including implementation of the methods, components, and so forth described herein. The hardware layer 2252 also includes memory and/or storage 2256, which also have the executable instructions 2204. The hardware layer 2252 may also comprise other hardware 1258.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 22, the software architecture 2206 may be conceptualized as a stack of layers where each layer provides particular functionality. For example, the software architecture 2206 may include layers such as an operating system 2202, libraries 2220, frameworks/middleware 2218, applications 2216, and a presentation layer 2214. Operationally, the applications 2216 and/or other components within the layers may invoke API calls 2208 through the software stack and receive a response as messages 2210. The layers illustrated are representative in nature and not all software architectures have all layers. For example, some mobile or special-purpose operating systems may not provide a frameworks/middleware 2218 layer, while others may provide such a layer. Other software architectures may include additional or different layers.

The operating system 2202 may manage hardware resources and provide common services. The operating system 2202 may include, for example, a kernel 2222, services 2224, and drivers 2226. The kernel 2222 may act as an abstraction layer between the hardware and the other software layers. For example, the kernel 2222 may be responsible for memory management, processor management (e.g., scheduling), component management, networking, security settings, and so on. The services 2224 may provide other common services for the other software layers. The drivers 2226 are responsible for controlling or interfacing with the underlying hardware. For instance, the drivers 2226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2220 provide a common infrastructure that is used by the applications 2216 and/or other components and/or layers. The libraries 2220 provide functionality that allows other software components to perform tasks in an easier fashion than by interfacing directly with the underlying operating system 2202 functionality (e.g., kernel 2222, services 2224, and/or drivers 2226). The libraries 2220 may include system libraries 2244 (e.g., C standard library) that may provide functions such as memory allocation functions, string manipulation functions, mathematical functions, and the like. In addition, the libraries 2220 may include API libraries 2246 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 2220 may also include a wide variety of other libraries 2248 to provide many other APIs to the applications 2216 and other software components/modules.

The frameworks/middleware 2218 provide a higher-level common infrastructure that may be used by the applications 2216 and/or other software components/modules. For example, the frameworks/middleware 2218 may provide various graphic user interface (GUI) functions, high-level resource management, high-level location services, and so forth. The frameworks/middleware 2218 may provide a broad spectrum of other APIs that may be utilized by the applications 2216 and/or other software components/modules, some of which may be specific to a particular operating system 2202 or platform.

The applications 2216 include built-in applications 2238 and/or third-party applications 2240. Examples of representative built-in applications 2238 may include, but are not limited to, a contacts application, a browser application, a book reader application, a location application, a media application, a messaging application, and/or a game application. The third-party applications 2240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 2240 may invoke the API calls 2208 provided by the mobile operating system (such as the operating system 2202) to facilitate functionality described herein.

The applications 2216 may use built-in operating system functions (e.g., kernel 2222, services 2224, and/or drivers 2226), libraries 2220, and frameworks/middleware 2218 to create user interfaces to interact with users of the system. Alternatively, or additionally, in some systems interactions with a user may occur through a presentation layer, such as the presentation layer 2214. In these systems, the application/component "logic" can be separated from the aspects of the application/component that interact with a user.

Exemplary Machine

Figure 23:
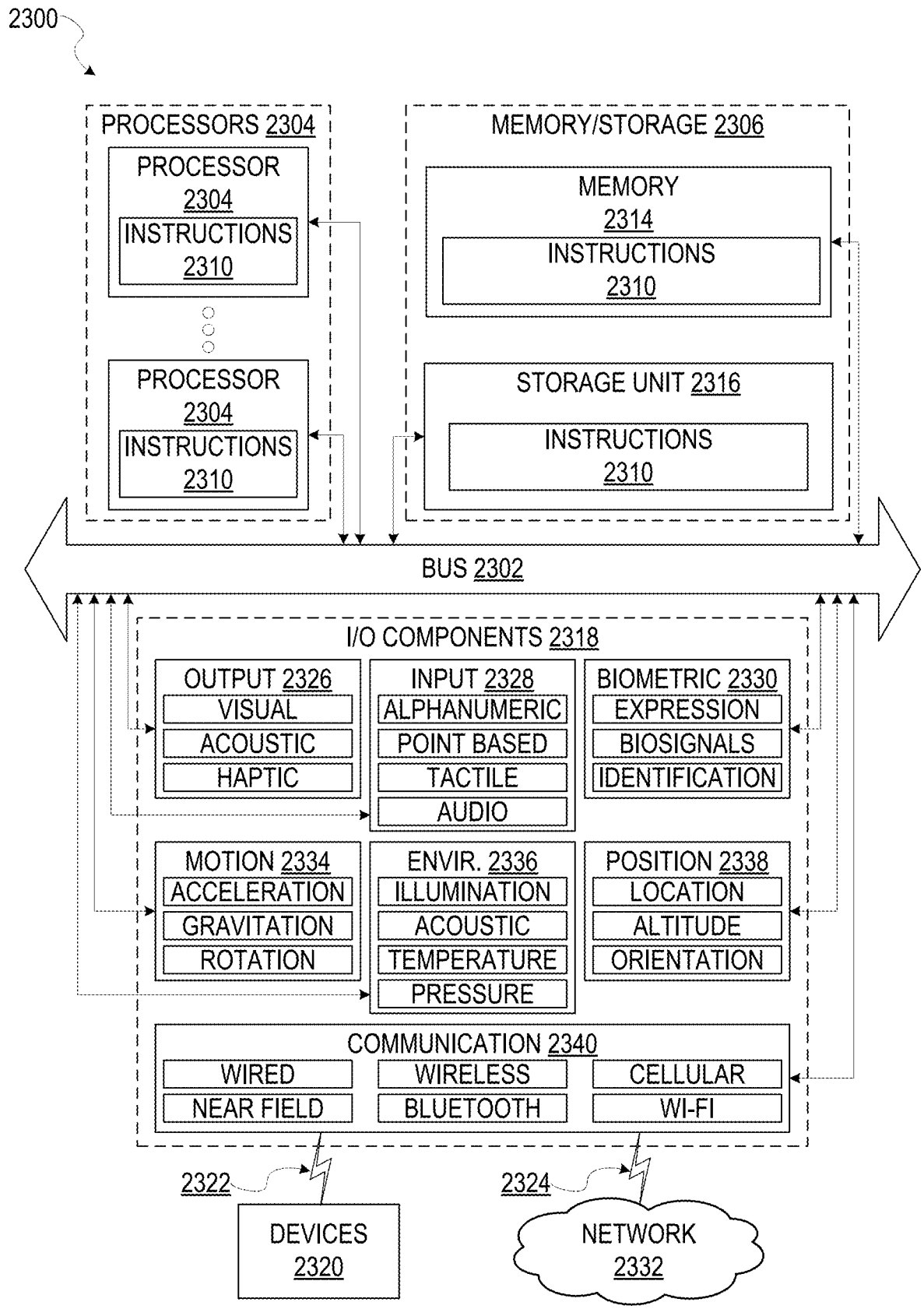
FIG. 23 is a block diagram illustrating exemplary components (also referred to herein as "modules") of a machine.

FIG. 23 is a block diagram illustrating exemplary components (also referred to herein as "modules") of a machine 2300. In some aspects, the machine is configured to read instructions from a machine-readable medium (e.g., a machine-readable storage medium) and perform any one or more of the methodologies discussed herein. Specifically, FIG. 23 shows a diagrammatic representation of the machine 2300 in the example form of a computer system, within which instructions 2310 (e.g., software, a program, an application, an applet, an app, or other executable code) for causing the machine 2300 to perform any one or more of the methodologies discussed herein may be executed. As such, the instructions 2310 may be used to implement modules or components described herein. The instructions 2310 transform the general, non-programmed machine 2300 into a particular machine 2300 programmed to carry out the described and illustrated functions in the manner described. In alternative embodiments, the machine 2300 operates as a standalone device or may be coupled (e.g., networked) to other machines. In a networked deployment, the machine 2300 may operate in the capacity of a server machine or a client machine in a server-client network environment, or as a peer machine in a peer-to-peer (or distributed) network environment. The machine 2300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2310, sequentially or otherwise, that specify actions to be taken by machine 2300. Further, while only a single machine 2300 is illustrated, the term "machine" shall also be taken to include a collection of machines that individually or jointly execute the instructions 2310 to perform any one or more of the methodologies discussed herein.

The machine 2300 may include processors 2304, memory/storage 2306, and I/O components 2318, which may be configured to communicate with each other such as via a bus 2302. The memory/storage 2306 may include a memory 2314, such as a main memory, or other memory storage, and a storage unit 2316, both accessible to the processors 2304 such as via the bus 2302. The storage unit 2316 and memory 2314 store the instructions 2310 embodying any one or more of the methodologies or functions described herein. The instructions 2310 may also reside, completely or partially, within the memory 2314, within the storage unit 2316, within at least one of the processors 2304 (e.g., within the processor's cache memory), or any suitable combination thereof, during execution thereof by the machine 2300. Accordingly, the memory 2314, the storage unit 2316, and the memory of the processors 2304 are examples of machine-readable media. In some aspect, the processors 410 and processors 2304 may be the same processors.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes transitory signals per se.

The I/O components 2318 may include a wide variety of components to provide a user interface for receiving input, providing output, producing output, transmitting information, exchanging information, capturing measurements, and so on. The specific I/O components 2318 that are included in the user interface of a particular machine 2300 will depend on the type of machine. For example, portable machines such as mobile phones will likely include a touch input device or other such input mechanisms, while a headless server machine will likely not include such a touch input device. It will be appreciated that the I/O components 2318 may include many other components that are not shown in FIG. 23. The I/O components 2318 are grouped according to functionality merely for simplifying the following discussion and the grouping is in no way limiting. In various exemplary embodiments, the I/O components 2318 may include output components 2326 and input components 2328. The output components 2326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2328 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 2328 may also include one or more image-capturing devices, such as a digital camera for generating digital images and/or video.

In further exemplary embodiments, the I/O components 2318 may include biometric components 2330, motion components 2334, environment components 2336, or position components 2338, as well as a wide array of other components. For example, the biometric components 2330 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 2334 may include acceleration sensor components (e.g., accelerometer), gravitation sensor components, rotation sensor components (e.g., gyroscope), and so forth. The environment components 2336 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 2338 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2318 may include communication components 2340 operable to couple the machine 2300 to a network 2332 or devices 2320 via a coupling 2324 and a coupling 2322 respectively. For example, the communication components 2340 may include a network interface component or other suitable device to interface with the network 2332. In further examples, the communication components 2340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2320 may be another machine or any of a wide variety of peripheral devices (e.g., a peripheral device coupled via a USB).

Moreover, the communication components 2340 may detect identifiers or include components operable to detect identifiers. For example, the communication components 2340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 2340, such as location via Internet Protocol (IP) geo-location, location via Wi-Fi® signal triangulation, location via detecting an NFC beacon signal that may indicate a particular location, and so forth.

Figure 24:
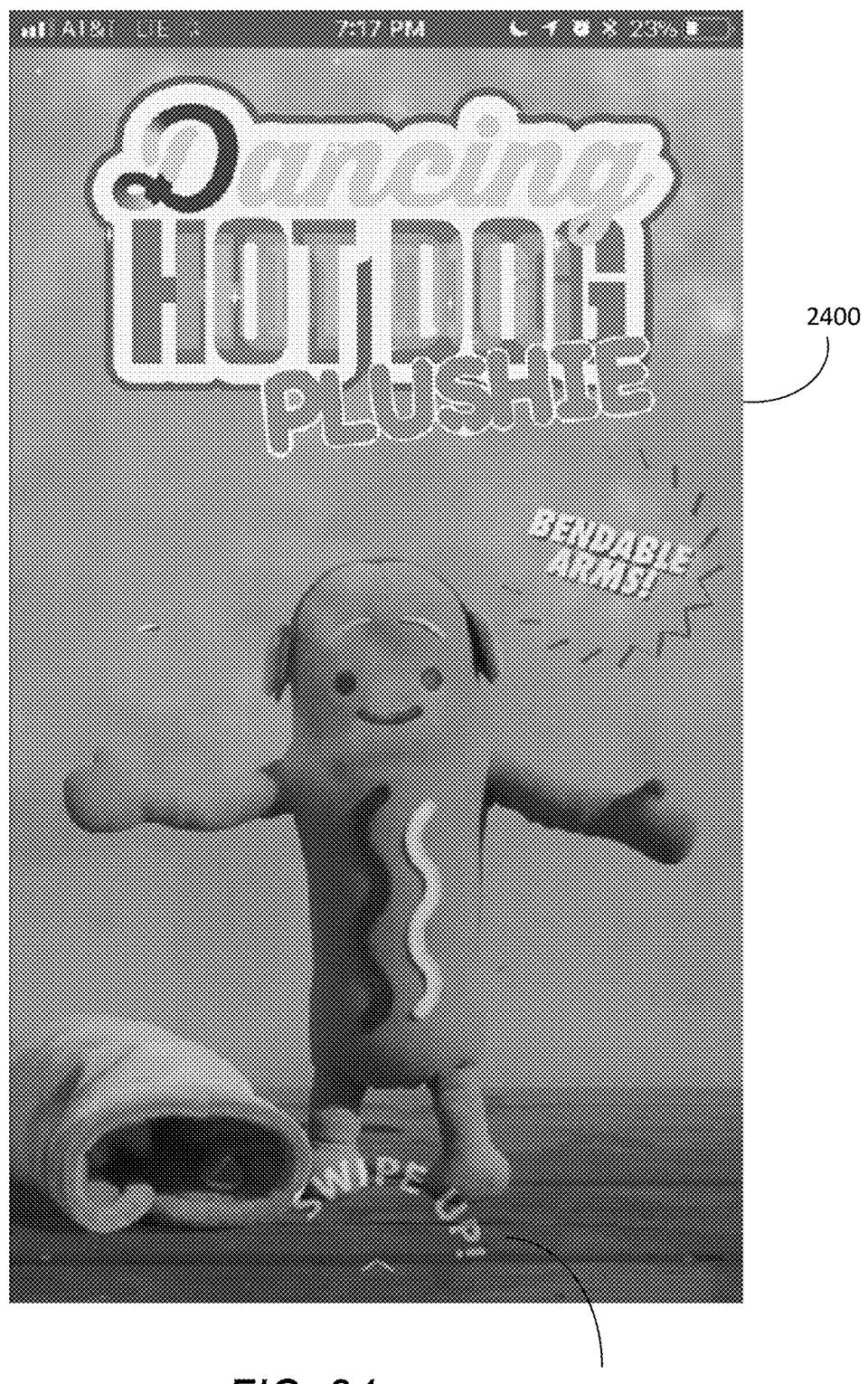
FIG. 24 shows an example video window.

FIG. 24 shows an example video window 2400. The video window 2400 displays a video. The video window 2400 also includes a swipe up prompt 2410. If a user swipes up in the video window 2400, a product details page, such as that shown in FIG. 25, may be displayed.

Figure 25:
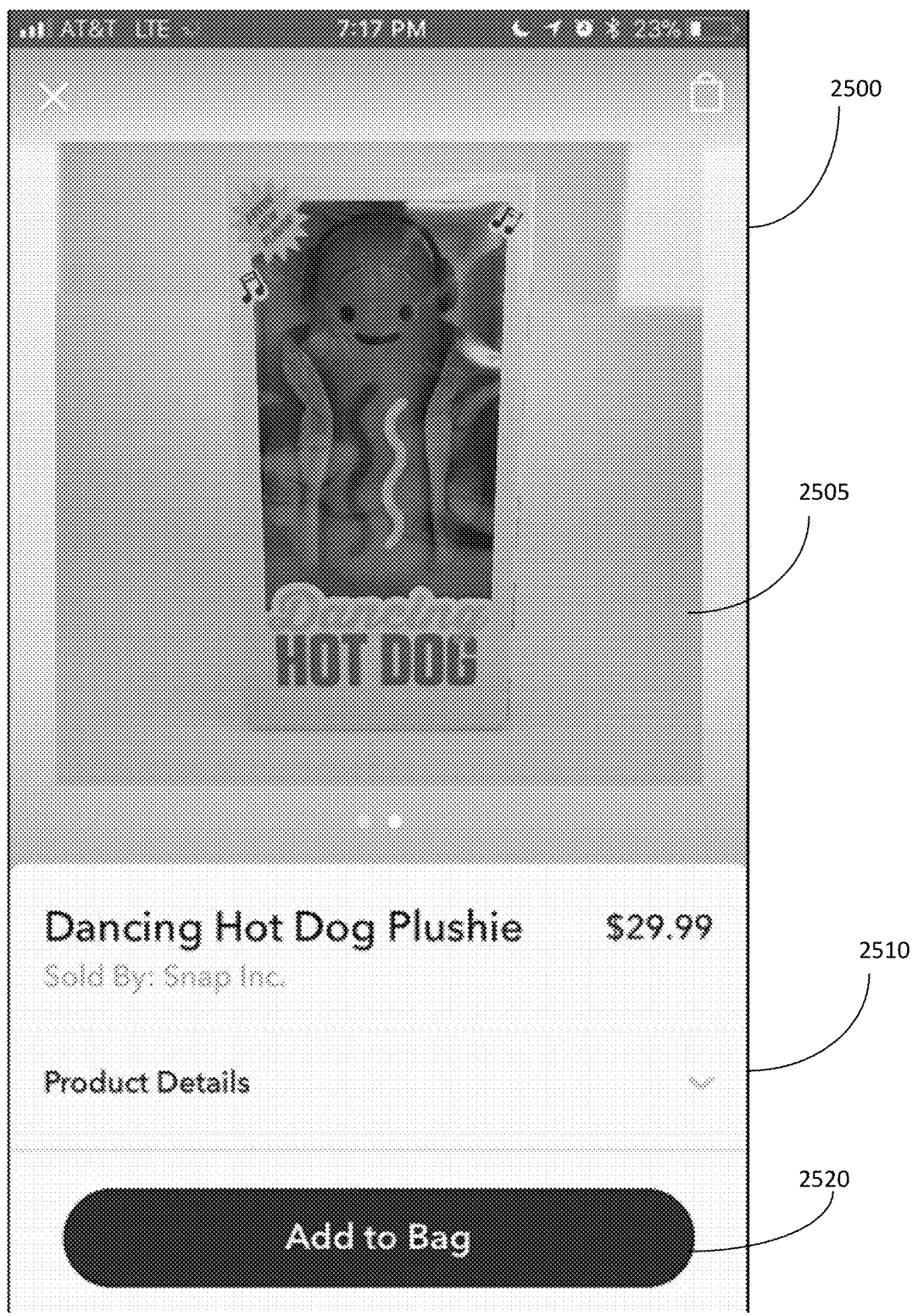
FIG. 25 shows an example product details page.

FIG. 25 shows an example product details page. The product details page 2500 may be displayed in response to a swipe up input received in the video window 2400. The product details page includes a product image 2505, a product details menu 2510, and a button 2520 that will add the referenced product to a shopping cart or bag.

Figure 26:
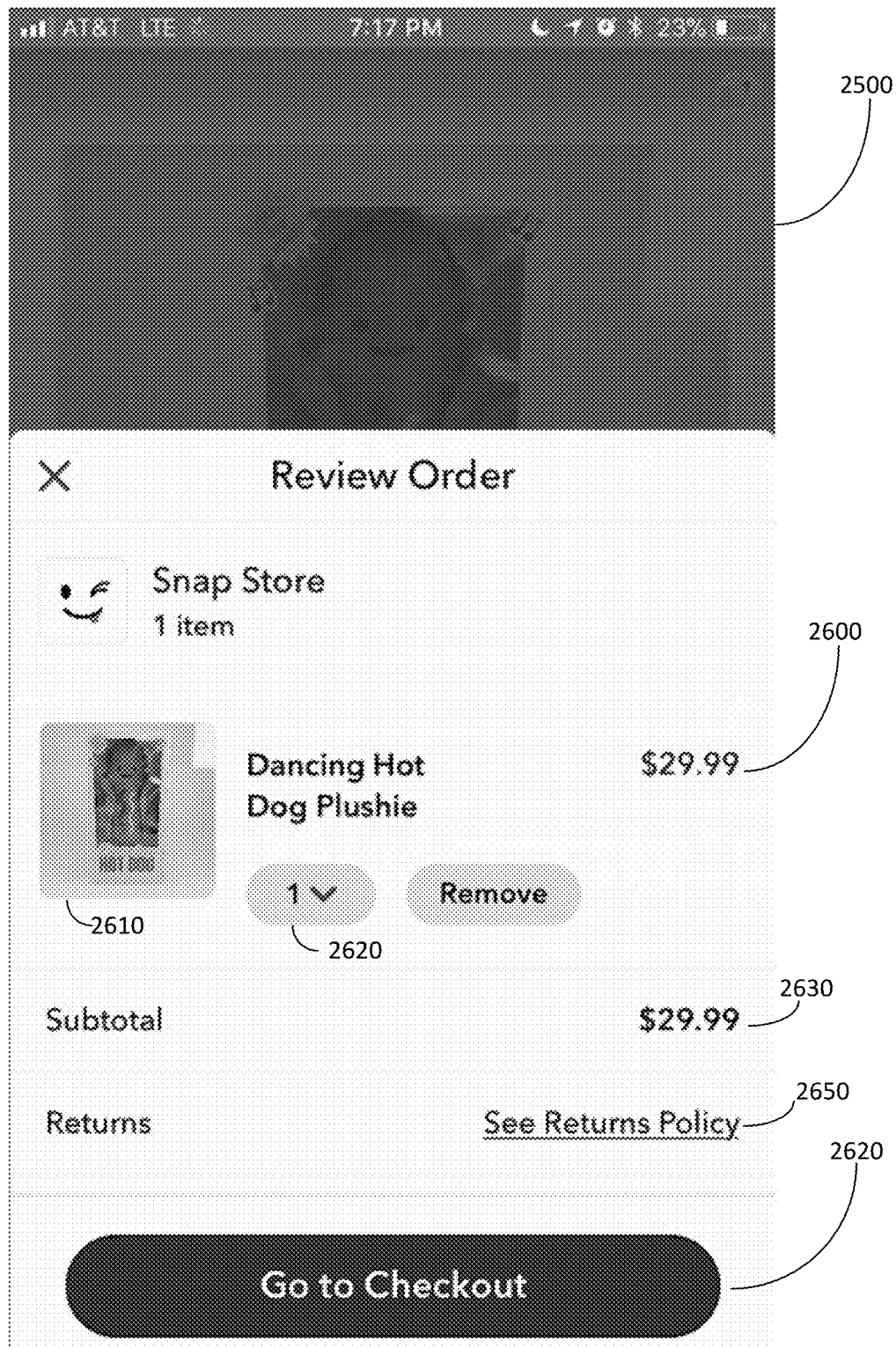
FIG. 26 shows an example embodiment of a review order page.

FIG. 26 shows an example embodiment of a review order page. The review order page 2600 that is displayed on top of the product details page 2500 of FIG. 25. The review order page 2600 shows a small image of the product 2610, a quantity indicator 2620, a price 2630, a subtotal 2640, a returns policy link 2650. The review order page 2600 also includes a checkout button 2620. Selection of the checkout button 2620 may display a checkout page, as discussed below with respect to FIG. 27.

Figure 27:
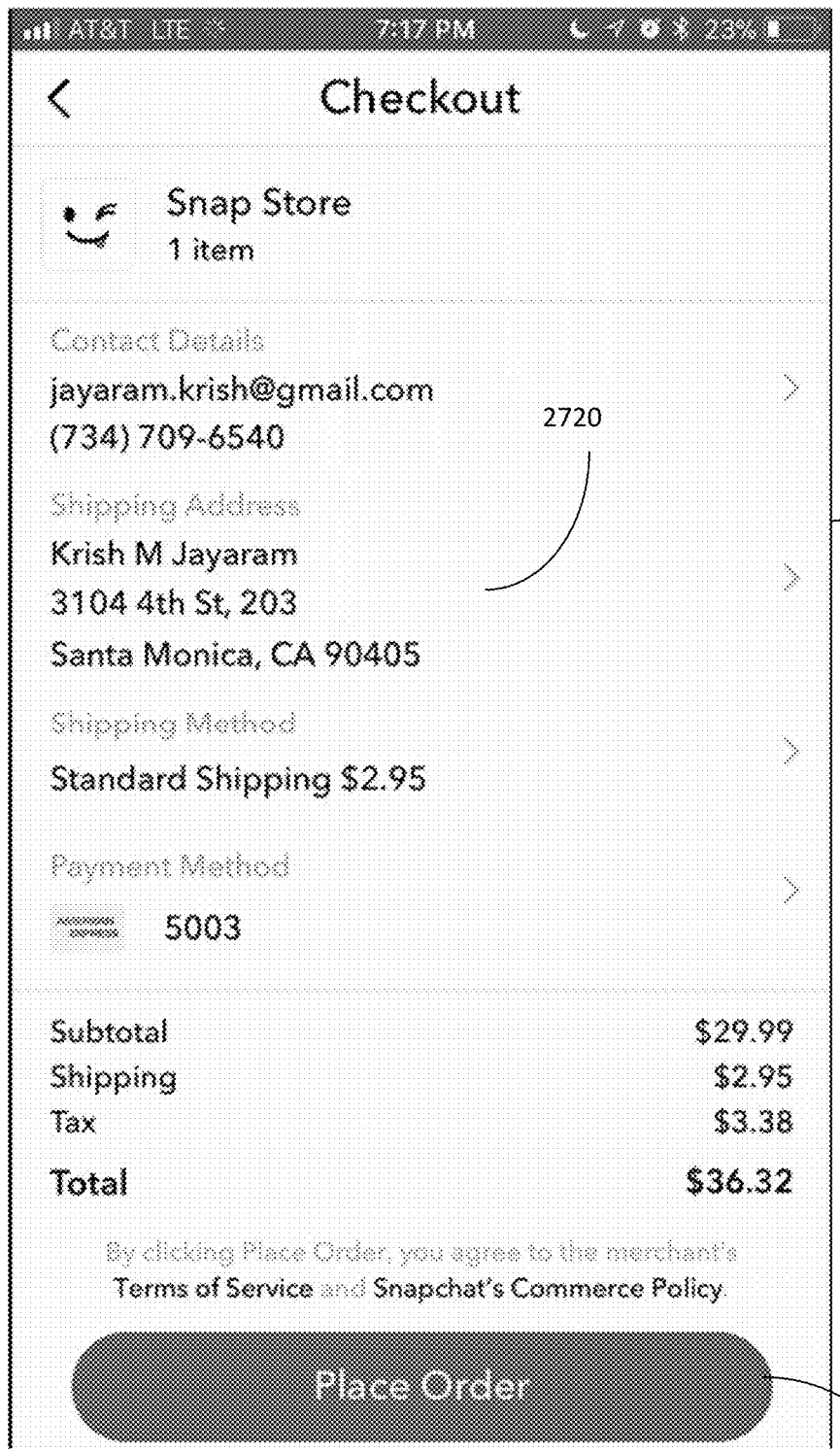
FIG. 27 shows an example checkout page.

FIG. 27 shows an example checkout page 2700. The checkout page 2700 includes a place order button 2710. Order details 2720 are also shown. When the place order button 2710 is selected, a purchase confirmation order window, as shown in FIG. 28 may be displayed.

Figure 28:
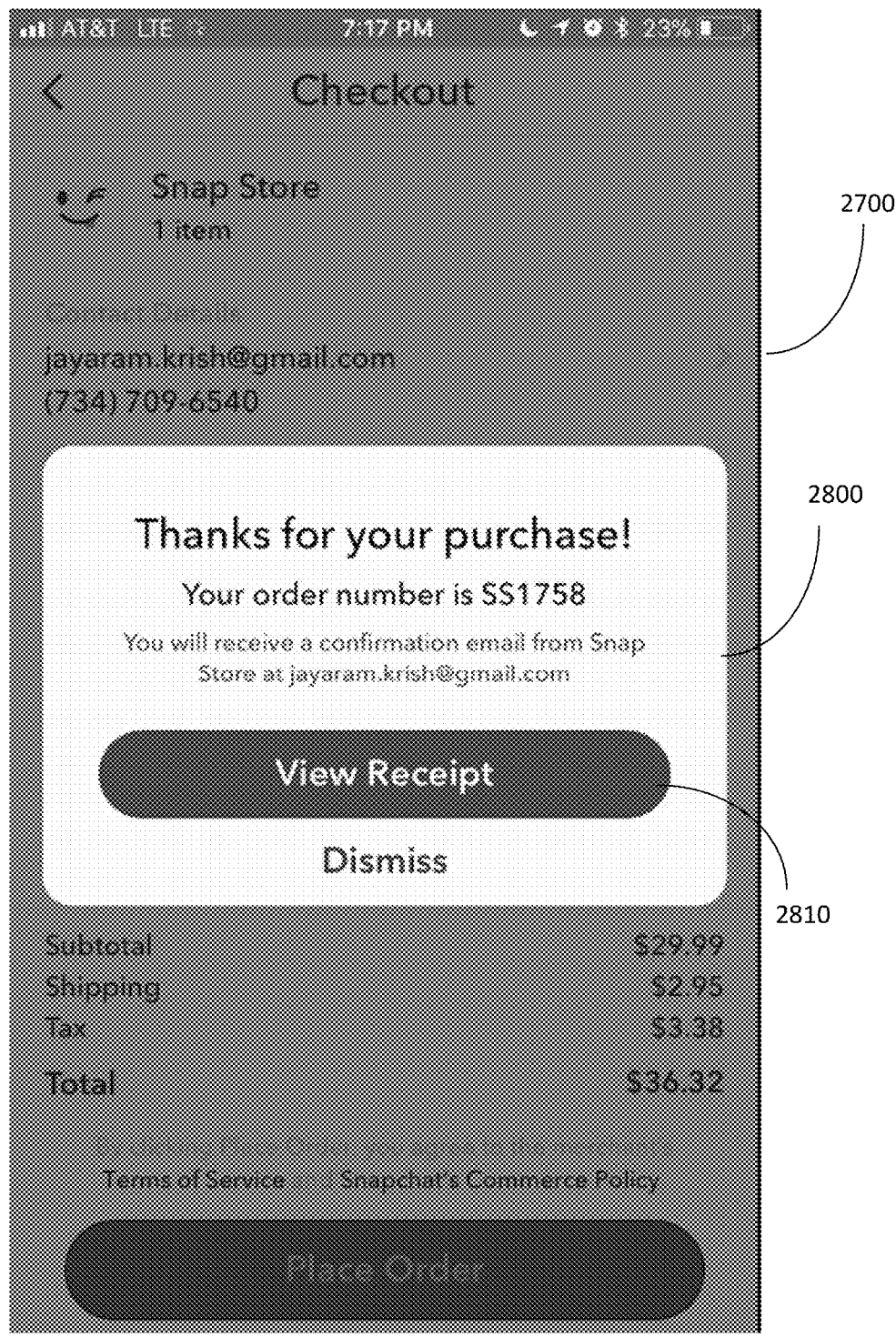
FIG. 28 shows an example purchase confirmation window.

FIG. 28 shows an example purchase confirmation window 2800. The purchase confirmation window 2800 is displayed on top of the checkout page 2700. The purchase confirmation window 2800 includes a view receipt button 2810. Selection of the view receipt button 2810 may display a receipt for the purchase.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SNAPCHAT, INC., All Rights Reserved.

I claim:

1. A method of providing a cross vendor ecommerce system, comprising:
   receiving, by a messaging application server, a plurality of import data, each import data from a different product vendor via a native user interface of a messaging application;
   generating, by the messaging application server, a barcode for products identified in each of the plurality of import data;
   writing the generated barcodes and indications of corresponding vendors to a barcode database;
   identifying product information from each of the import data;
   writing the product information to a product database;
   receiving, by the messaging application server, an image depicting a barcode from a client device;
   identifying the barcode from the image received from the client device;
   searching the barcode database for the identified barcode;
   identifying a product associated with the identified barcode based on the search;
   generating for display on the client device, the native user interface based on the identified product;
   receiving, by the messaging application server from the messaging application on the client device, input from the native user interface;
   providing, by the messaging server, an ecommerce transaction based on the input within the native user interface of the messaging application without transitioning the client device away from the native user interface of the messaging application to a web interface that is provided by a different entity than an entity associated with the messaging application server;
   identifying, by the messaging application server, a plurality of image modification features available to the user after performing the ecommerce transaction;
   causing the messaging application on the client device to enable at least one image modification feature of the plurality of image modification features after performing the ecommerce transaction in response to receiving the image from the client device that depicts the barcode; and
   causing display, via the native user interface of the messaging application, of an ephemeral message using the at least one image modification feature, wherein the ephemeral message is deleted after a predetermined amount of time has elapsed.

2. The method of claim 1, further comprising:
   identifying product information including a product image and a product description from each of the import data, and
   writing the product image and the product description to the product database.

3. The method of claim 1, further comprising:
   identifying a first product from a first vendor based on a first optical barcode;
   identifying a second product from a second vendor based on a second optical barcode;
   adding the first product and the second product to a shopping bag; and
   purchasing the first product and the second product via a single ecommerce transaction.

4. The method of claim 3, further comprising:
   generating the ephemeral message indicating the transaction; and
   transmitting the ephemeral message.

5. The method of claim 1, wherein the at least one image modification feature includes a lens, filter, or sticker, further comprising associating an identifier of the product in the barcode database with one or more post purchase features, the post purchase features include features of the messaging application that are made available to the messaging application after a purchase occurs in response to scanning the barcode corresponding to the product.

6. The method of claim 1, further comprising:
   determining that a condition is associated with the barcode, the condition identifying a predetermined time range;
   comparing the current time to the predetermined time range in the condition; and
   in response to determining that the current time is within the predetermined time range in the condition, determining that the barcode is active and causing the user interface of the messaging application for the product to be displayed.

7. A method of associating a barcode with an item, comprising:
   receiving, by a messaging application server, a plurality of import data, each import data from a different entity via a native user interface of a messaging application;
   generating, by the messaging application server, a barcode for items identified in each of the plurality of import data;
   writing the generated barcodes and indications of the entities associated with the corresponding items to a barcode database;
   identifying item information from each of the import data;
   writing the item information to a database;
   receiving, by the messaging application server, an image depicting a barcode from a client device;
   identifying the barcode from the image received from the client device;
   searching the barcode database for the identified barcode;
   identifying an item associated with the identified barcode based on the search;
   generating for display on the client device, the native user interface based on the identified item;
   receiving, by the messaging application server from the messaging application on the client device, input from the native user interface;
   performing, by the messaging server, a transaction based on the input within the native user interface of the messaging application without transitioning the client device away from the native user interface of the messaging application to a web interface that is provided by a different entity than an entity associated with the messaging application server;
   identifying, by the messaging application server, a plurality of image modification features available to the user after performing the transaction;
   causing the messaging application on the client device to enable at least one image modification feature of the plurality of image modification features after performing the transaction in response to receiving the image from the client device that depicts the barcode; and
   causing display, via the native user interface of the messaging application, of an ephemeral message using the at least one image modification feature, wherein the ephemeral message is deleted after a predetermined amount of time has elapsed.

8. The method of claim 7, further comprising:
identifying item information including an image and a description from each of the import data, and
writing the image and the description to the database.

9. The method of claim 7, further comprising:
identifying a first item from a first entity based on a first optical barcode;
identifying a second item from a second entity based on a second optical barcode;
associating the first item and the second item; and
performing a transmission based on the first and second items.

10. The method of claim 7, wherein the at least one image modification feature includes a lens, filter, or sticker, further comprising associating an identifier of the item in the barcode database with one or more post purchase features, the post purchase features include features of the messaging application that are made available to the messaging application after a purchase occurs in response to scanning the barcode corresponding to the item.

11. A system of providing a cross vendor ecommerce system, comprising:
one or more electronic hardware processors; and
an electronic hardware memory operably coupled to the one or more electronic hardware processors, and storing instructions that when executed configure the one or more electronic hardware processors to perform operations comprising:
receiving, by a messaging application server, a plurality of import data, each import data from a different product vendor via a native user interface of a messaging application;
generating, by the messaging application server, a barcode for products identified in each of the plurality of import data;
writing the generated barcodes and indications of corresponding vendors to a barcode database;
identifying product information from each of the import data;
writing the product information to a product database;
receiving, by the messaging application server, an image depicting a barcode from a client device;
identifying the barcode from the image received from the client device;
searching the barcode database for the identified barcode;
identifying a product associated with the identified barcode based on the search;
generating for display on the client device, the native user interface based on the identified product;
receiving, by the messaging application server from the messaging application on the client device, input from the native user interface;
providing, by the messaging server, an ecommerce transaction based on the input within the native user interface of the messaging application without transitioning the client device away from the native user interface of the messaging application to a web interface that is provided by a different entity than an entity associated with the messaging application server;
identifying, by the messaging application server, a plurality of image modification features available to the user after performing the ecommerce transaction;
causing the messaging application on the client device to enable at least one image modification feature of the plurality of image modification features after performing the ecommerce transaction in response to receiving the image from the client device that depicts the barcode; and
causing display, via the native user interface of the messaging application, of an ephemeral message using the at least one image modification feature, wherein the ephemeral message is deleted after a predetermined amount of time has elapsed.

12. The system of claim 11, wherein the electronic hardware memory stores further instructions that when executed cause the one or more electronic hardware processors to:
identify product information including a product image and a product description from each of the import data, and
write the product image and the product description to the product database.

13. The system of claim 11, further comprising:
identifying a first product from a first vendor based on a first optical barcode;
identifying a second product from a second vendor based on a second optical barcode;
adding the first product and the second product to a shopping bag; and
purchasing the first product and the second product via a single ecommerce transaction.

14. The system of claim 13, wherein the electronic hardware memory stores further instructions that when executed cause the one or more electronic hardware processors to generate the ephemeral message indicating the transaction; and transmit the ephemeral message.

15. The system of claim 11, wherein the at least one image modification feature includes a lens, filter, or sticker, further comprising associating an identifier of the product in the barcode database with one or more post purchase features, the post purchase features include features of the messaging application that are made available to the messaging application after a purchase occurs in response to scanning the barcode corresponding to the product.

16. The system of claim 11, wherein the electronic hardware memory stores further instructions that when executed cause the one or more electronic hardware processors to perform operations comprising:
determining that a condition is associated with the barcode, the condition identifying a predetermined time range;
comparing the current time to the predetermined time range in the condition; and
in response to determining that the current time is within the predetermined time range in the condition, determining that the barcode is active and causing the user interface of the messaging application for the product to be displayed.

17. A non-transitory computer readable storage medium comprising instructions that when executed cause a hardware processor to perform a method of providing a cross vendor ecommerce system, the method comprising:
receiving, by a messaging application server, a plurality of import data, each import data from a different product vendor via a native user interface of a messaging application;
generating, by the messaging application server, a barcode for products identified in each of the plurality of import data;
writing the generated barcodes and indications of corresponding vendors to a barcode database;
identifying product information from each of the import data;

writing the product information to a product database;
receiving, by the messaging application server, an image depicting a barcode from a client device;
identifying the barcode from the image received from the client device;
searching the barcode database for the identified barcode;
identifying a product associated with the identified barcode based on the search;
generating for display on the client device, the native user interface based on the identified product;
receiving, by the messaging application server from the messaging application on the client device, input from the native user interface;
providing, by the messaging server, an ecommerce transaction based on the input within the native user interface of the messaging application without transitioning the client device away from the native user interface of the messaging application to a web interface that is provided by a different entity than an entity associated with the messaging application server;

identifying, by the messaging application server, a plurality of image modification features available to the user after performing the ecommerce transaction;
causing the messaging application on the client device to enable at least one image modification feature of the plurality of image modification features after performing the ecommerce transaction in response to receiving the image from the client device that depicts the barcode; and
causing display, via the native user interface of the messaging application, of an ephemeral message using the at least one image modification feature, wherein the ephemeral message is deleted after a predetermined amount of time has elapsed.

18. The system of claim 17, further comprising:
identifying product information including a product image and a product description from each of the import data, and
writing the product image and the product description to the product database.

\* \* \* \* \*